(12) United States Patent
Seok

(10) Patent No.: US 10,743,309 B2
(45) Date of Patent: *Aug. 11, 2020

(54) METHOD AND APPARATUS FOR FRAME EXCHANGE IN A HIGH EFFICIENCY WIRELESS LAN

(71) Applicant: NEWRACOM, Inc., Lake Forest, CA (US)

(72) Inventor: Yongho Seok, Irvine, CA (US)

(73) Assignee: NEWRACOM, Inc., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,663

(22) Filed: Apr. 3, 2018

(65) Prior Publication Data
US 2018/0227913 A1   Aug. 9, 2018

Related U.S. Application Data

(63) Continuation of application No. 15/045,198, filed on Feb. 16, 2016, now Pat. No. 9,967,877.

(60) Provisional application No. 62/140,342, filed on Mar. 30, 2015, provisional application No. 62/136,400, filed on Mar. 20, 2015, provisional application No.
(Continued)

(51) Int. Cl.
*H04W 72/04* (2009.01)
*H04L 29/06* (2006.01)
*H04L 29/08* (2006.01)
*H04W 84/12* (2009.01)

(52) U.S. Cl.
CPC ......... *H04W 72/0446* (2013.01); *H04L 69/22* (2013.01); *H04L 69/322* (2013.01); *H04W 72/044* (2013.01); *H04W 84/12* (2013.01)

(58) Field of Classification Search
CPC ... H04W 4/06; H04W 72/005; H04W 72/044; H04W 72/0446; H04W 84/12; H04W 88/08
See application file for complete search history.

(56) References Cited

U.S. PATENT DOCUMENTS 9,271,241 B2 * 2/2016 Kenney ............... H04W 52/241
9,295,074 B2   3/2016 Zhu et al.
(Continued)

OTHER PUBLICATIONS

Non-Final Office Action from U.S. Appl. No. 14/811,740, dated May 5, 2017, 7 pages.
(Continued)

*Primary Examiner* — Michael Thier
*Assistant Examiner* — Prince A Mensah
(74) *Attorney, Agent, or Firm* — NDWE LLP

(57) ABSTRACT

A frame exchange in a High Efficiency WLAN (HEW) includes a method for exchanging frames implemented by an access point in a wireless local area network. The method further includes transmitting to one or more stations (STAs) a first frame eliciting a second frame from the one or more STAs in a downlink (DL) Physical layer Protocol Data Unit (PPDU), wherein the DL PPDU carrying the first frame includes information indicating a type of a PPDU carrying the second frame from PPDU types including a Single User (SU) PPDU and a Multiple User (MU) PPDU; and receiving from the one or more STAs the second frame in an uplink (UL) PPDU having a type determined based on the information indicating the type of the PPDU.

18 Claims, 28 Drawing Sheets

HE PPDU FORMAT

Related U.S. Application Data

62/127,765, filed on Mar. 3, 2015, provisional application No. 62/117,133, filed on Feb. 17, 2015.

(56) References Cited

U.S. PATENT DOCUMENTS

| | | | |
|---|---|---|---|
| 9,866,359 | B2 | 1/2018 | Seok et al. |
| 2009/0098892 | A1 | 4/2009 | Trogolo et al. |
| 2012/0170565 | A1 | 7/2012 | Seok |
| 2013/0272179 | A1 | 10/2013 | Liu et al. |
| 2014/0126495 | A1 | 5/2014 | Kubota |
| 2014/0204891 | A1 | 7/2014 | Park et al. |
| 2015/0023335 | A1 | 1/2015 | Vermani et al. |
| 2015/0063190 | A1 | 3/2015 | Merlin et al. |
| 2015/0124690 | A1* | 5/2015 | Merlin .................. H04L 5/0055 370/312 |
| 2015/0250003 | A1 | 9/2015 | Seok et al. |
| 2015/0319747 | A1 | 11/2015 | Chu et al. |
| 2015/0365263 | A1 | 12/2015 | Zhang et al. |
| 2015/0365923 | A1 | 12/2015 | Vermani et al. |
| 2015/0365972 | A1 | 12/2015 | Seok |
| 2015/0382342 | A1 | 12/2015 | Seok et al. |
| 2016/0050093 | A1* | 2/2016 | Choi .................. H04L 27/2602 375/308 |
| 2016/0057657 | A1 | 2/2016 | Seok |
| 2016/0088126 | A1* | 3/2016 | Doan ...................... H04L 69/22 370/329 |
| 2016/0119453 | A1 | 4/2016 | Tian et al. |
| 2016/0227436 | A1* | 8/2016 | Vermani ............... H04W 28/06 |
| 2016/0234831 | A1* | 8/2016 | Tian .................. H04W 72/0413 |
| 2016/0353370 | A1 | 12/2016 | Choi et al. |
| 2017/0104565 | A1 | 4/2017 | Seok |
| 2017/0105143 | A1 | 4/2017 | Seok |
| 2017/0105213 | A1 | 4/2017 | Seok |
| 2017/0118604 | A1 | 4/2017 | Kim et al. |
| 2017/0118775 | A1 | 4/2017 | Seok |
| 2017/0170937 | A1 | 6/2017 | Chun et al. |

OTHER PUBLICATIONS

Non-Final Office Action from U.S. Appl. No. 14/831,627, dated Sep. 22, 2017, 14 pages.

Notice of Allowance from U.S. Appl. No. 14/811,740, dated Sep. 1, 2017, 5 pages.

Requirement for Restriction/Election from U.S. Appl. No. 14/831,627, dated Apr. 28, 2017, 5 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

Non-Final Office Action from U.S. Appl. No. 15/045,198, dated Jul. 10, 2017, 12 pages.

Notice of Allowance from U.S. Appl. No. 15/045,198, dated Jan. 29, 2018, 15 pages.

Final Office Action, U.S. Appl. No. 14/831,627, dated Apr. 17, 2018, 14 pages.

Non-Final Office Action, U.S. Appl. No. 14/811,740, dated May 5, 2017, 7 pages.

Non-Final Office Action, U.S. Appl. No. 14/831,627, dated Jan. 10, 2019, 17 pages.

Non-Final Office Action, U.S. Appl. No. 14/831,627, dated Nov. 6, 2019, 15 pages.

Non-Final Office Action, U.S. Appl. No. 14/831,627, dated Sep. 22, 2017, 14 pages.

Notice of Allowance, U.S. Appl. No. 14/811,740, dated Sep. 1, 2017, 5 pages.

* cited by examiner

HE PPDU FORMAT

FIG. 11

| L-STF | L-LTF | L-SIG | HE-SIG-A | HE-STF | HE-LTF | HE-LTF | HE-LTF | HE-LTF | HE-SIG-B | PSDU(AP TO STA6) |
| | | | | HE-STF | HE-LTF | HE-LTF | HE-LTF | HE-LTF | HE-SIG-B | PSDU(AP TO STA5) |
| | | | | HE-STF | HE-LTF | HE-LTF | HE-LTF | HE-LTF | HE-SIG-B | PSDU(AP TO STA3, STA4) |
| | | | | HE-STF | HE-LTF | HE-LTF | HE-LTF | HE-LTF | HE-SIG-B | PSDU(AP TO STA1, STA2) |

FIG. 12

| L-STF | L-LTF | L-SIG | HE-SIG-A | HE-STF | HE-LTF | HE-SIG-B | HE-LTF | HE-LTF | HE-LTF | HE-SIG-C | PSDU(AP TO STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP TO STA5) |
| | | | | HE-STF | HE-LTF | HE-SIG-B | HE-LTF | HE-LTF | HE-LTF | HE-SIG-C | PSDU(AP TO STA3, STA4) |
| | | | | HE-STF | HE-LTF | HE-SIG-B | HE-LTF | HE-LTF | HE-LTF | HE-SIG-C | PSDU(AP TO STA1, STA2) |

FIG. 15

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(STA4 TO AP) |
|---|---|---|---|---|---|---|---|---|---|---|---|---|
| | | | | HE-STF | HE-LTF | HE-SIG-B | HE-LTF | HE-LTF | HE-LTF | HE-LTF | HE-SIG-C | PSDU(STA3 TO AP) |
| | | | | HE-STF | HE-LTF | HE-SIG-B | HE-LTF | HE-LTF | HE-LTF | HE-LTF | HE-SIG-C | PSDU(STA2 TO AP) |
| | | | | HE-STF | HE-LTF | HE-SIG-B | HE-LTF | HE-LTF | HE-LTF | HE-LTF | HE-SIG-C | PSDU(STA1 TO AP) |

FIG. 25

| | | | | HE-STF | HE-LTF | HE-LTF | HE-LTF | HE-LTF | HE-LTF | PSDU |
|---|---|---|---|---|---|---|---|---|---|---|
| L-STF | L-LTF | L-SIG | HE-SIG-A (3 SYMBOLS) | HE-STF | HE-LTF | HE-LTF | HE-LTF | HE-LTF | HE-LTF | PSDU |
| L-STF | L-LTF | L-SIG | HE-SIG-A (3 SYMBOLS) | HE-STF | HE-LTF | HE-LTF | HE-LTF | HE-LTF | HE-LTF | PSDU |
| | | | HE-SIG-B (VARIABLE) | HE-STF | HE-LTF | HE-LTF | HE-LTF | HE-LTF | HE-LTF | PSDU |

8.0μs | 8.0μs | 4.0μs | 12.0μs | N × 4.0μs | 4 OR 8μs | 13.6, 14.4 OR 16μs | 13.6, 14.4 OR 16μs | 13.6, 14.4 OR 16μs | 13.6, 14.4 OR 16μs | 13.6, 14.4 OR 16μs | 13.6, 14.4 OR 16μs

20MHz / 20MHz

FIG. 26

| | | | | | HE-STF | HE-LTF | HE-LTF | HE-LTF | HE-LTF | PSDU |
|---|---|---|---|---|---|---|---|---|---|---|
| L-STF | L-LTF | L-SIG | HE-SIG-A (3 SYMBOLS) | HE-SIG-B (VARIABLE) | HE-STF | HE-LTF | HE-LTF | HE-LTF | HE-LTF | PSDU |
| L-STF | L-LTF | L-SIG | HE-SIG-A (3 SYMBOLS) | | HE-STF | HE-LTF | HE-LTF | HE-LTF | HE-LTF | PSDU |
| | | | | | HE-STF | HE-LTF | HE-LTF | HE-LTF | HE-LTF | PSDU |
| 8.0μs | 8.0μs | 4.0μs | 12.0μs | N X 4.0μs | 4 OR 8μs | 7.2, 8.0 OR 9.6μs | 7.2, 8.0 OR 9.6μs | 7.2, 8.0 OR 9.6μs | 7.2, 8.0 OR 9.6μs | 13.6, 14.4 OR 16μs |

20MHz (rows 1-2), 20MHz (rows 3-4)

METHOD AND APPARATUS FOR FRAME EXCHANGE IN A HIGH EFFICIENCY WIRELESS LAN

CROSS-REFERENCE TO RELATED APPLICATIONS

This application is a continuation of U.S. application Ser. No. 15/045,198, filed Feb. 16, 2016, which application claims the benefits of U.S. Provisional Application No. 62/117,133, filed on Feb. 17, 2015, U.S. Provisional Application No. 62/127,765, filed on Mar. 3, 2015, U.S. Provisional Application No. 62/136,400, filed on Mar. 20, 2015, and U.S. Provisional Application No. 62/140,342, filed on Mar. 30, 2015, which are hereby incorporated by reference as if fully set forth herein.

FIELD

The embodiments relate to Wireless Local Area Networks (WLANs), and more particularly, to a method and apparatus for a frame exchange in a High Efficiency WLAN (HEW).

BACKGROUND

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

Developments in HEW aim at improving performance felt by users demanding high-capacity, high-rate services while supporting simultaneous access of numerous stations in an environment in which a plurality of APs is densely deployed and coverage areas of APs overlap. However, there is no specified method for a frame exchange including uplink single user transmission or uplink multiple user transmission in a HEW.

SUMMARY

The embodiments include a method and apparatus for a frame exchange including uplink single user transmission or uplink multiple user transmission in a HEW.

The embodiments are not limited to the specific descriptions provided herein by way of example, and additional embodiments will become apparent to those having ordinary skill in the pertinent art based upon the following descriptions.

In an aspect of the embodiments, a method for exchanging frames by an access point (AP) in a wireless local area network may be provided. The method may include transmitting to one or more stations (STAs) a first frame eliciting a second frame from the one or more STAs in a downlink (DL) Physical layer Protocol Data Unit (PPDU), wherein the DL PPDU carrying the first frame includes information indicating a type of a PPDU carrying the second frame from PPDU types including a Single User (SU) PPDU and a Multiple User (MU) PPDU; and receiving from the one or more STAs the second frame in an uplink (UL) PPDU having a type determined based on the information indicating the type of the PPDU.

In another aspect of the embodiments, a method for exchanging frames by an STA in a wireless local area network may be provided. The method may include receiving a first frame eliciting a second frame from an AP in a DL PPDU, wherein the DL PPDU carrying the first frame includes information indicating a type of a PPDU carrying the second frame from PPDU types including an SU PPDU and an MU PPDU; and transmitting to the AP the second frame in a UL PPDU having a type determined based on the information indicating the type of the PPDU.

In another aspect of the embodiments an AP apparatus for exchanging frames in a wireless local area network may be provided. The AP apparatus may include a processor, a transceiver, a memory, etc. The processor may be configured to transmit, using the transceiver, to one or more STAs a first frame eliciting a second frame from the one or more STAs in a DL PPDU, wherein the DL PPDU carrying the first frame includes information indicating a type of a PPDU carrying the second frame from PPDU types including an SU PPDU and an MU PPDU; and receive, using the transceiver, from the one or more STAs the second frame in a UL PPDU having a type determined based on the information indicating the type of the PPDU.

In another aspect of the embodiments, an STA apparatus for exchanging frames in a wireless local area network may be provided. The STA apparatus may include a processor, a transceiver, a memory, etc. The processor may be configured to receive, using the transceiver, a first frame eliciting a second frame from an AP in a DL PPDU, wherein the DL PPDU carrying the first frame includes information indicating a type of a PPDU carrying the second frame from PPDU types including an SU PPDU and an MU PPDU; and transmit, using the transceiver, to the AP the second frame in a UL PPDU having a type determined based on the information indicating the type of the PPDU.

In another aspect of the embodiments, a non-transitory computer-readable medium having instructions executable for an AP apparatus to exchange frames in a wireless local area network may be provided. The executable instructions may cause the AP apparatus to transmit to one or more STAs a first frame eliciting a second frame from the one or more STAs in a DL PPDU, wherein the DL PPDU carrying the first frame includes information indicating a type of a PPDU carrying the second frame from PPDU types including an SU PPDU and an MU PPDU; and receive from the one or more STAs the second frame in a UL PPDU having a type determined based on the information indicating the type of the PPDU.

In another aspect of the embodiments, a non-transitory computer-readable medium having instructions executable for an STA apparatus to exchange frames in a wireless local area network may be provided. The executable instructions may cause the STA apparatus to receive a first frame eliciting a second frame from an AP in a DL PPDU, wherein the DL PPDU carrying the first frame includes information indicating a type of a PPDU carrying the second frame from PPDU types including an SU PPDU and an MU PPDU; and transmit to the AP the second frame in a UL PPDU having a type determined based on the information indicating the type of the PPDU.

It is to be understood that the foregoing summarized features are example aspects of the following detailed description of the embodiments of the invention and are not intended to limit the scope of the embodiments.

According to the embodiments, a method and apparatus for a frame exchange including uplink single user transmission or uplink multiple user transmission in a HEW can be provided.

The advantages of the embodiments are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of a High Efficiency Long Training Field (HE-LTF) field in an HE PPDU frame format according to the present disclosure.

FIG. 12 depicts a High Efficiency SIGnal B (HE-SIG-B) field and a High Efficiency SIGnal C (HE-SIG-C) field in the HE PPDU frame format according to the present disclosure.

FIG. 15 depicts another example HE PPDU frame format according to the present disclosure.

FIGS. 25 and 26 depict additional exemplary HE PPDU formats according to the present disclosure.

DETAILED DESCRIPTION

Figure 1:
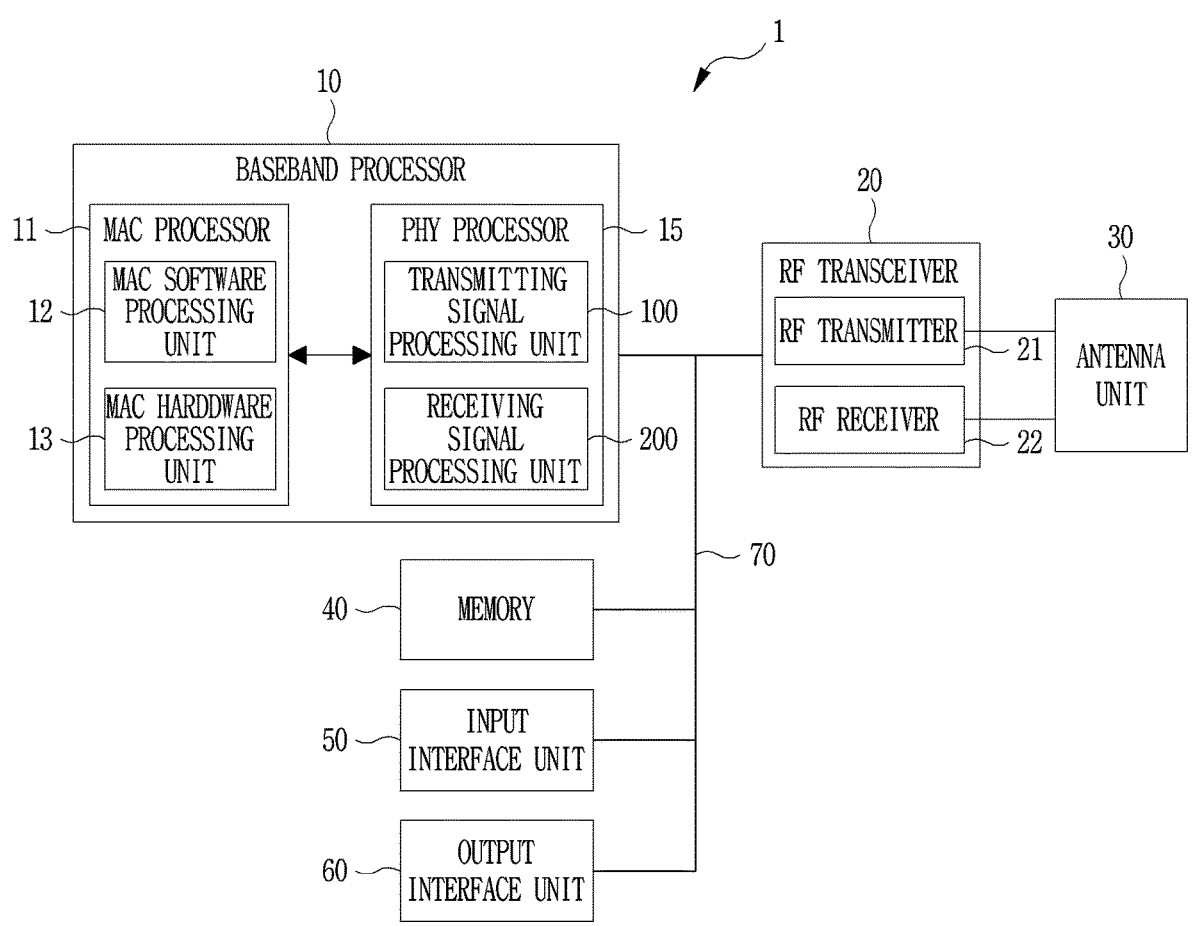
FIG. 1 is a block diagram of a Wireless Local Area Network (WLAN) device.

In the following detailed description, certain embodiments have been shown and described, by way of illustration. As those skilled in the art would realize, the described embodiments may be modified in various different ways, without departing from the spirit or scope of the present disclosure. Accordingly, the drawings and description are to be regarded as illustrative in nature and not restrictive. Like reference numerals designate like elements throughout the present disclosure.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, which may be or may include a non-transitory computer-readable medium, an input interface unit 50, an output interface unit 60, and a bus 70.

The baseband processor 10 may be simply referred to as a processor, and may perform baseband signal processing described in the present disclosure, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software or machine-executable instructions (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, embodiments of the MAC processor 11 are not limited to this distribution of functionality.

The PHY processor 15 includes a transmitting (TX) signal processing unit 100 and a receiving (RX) signal processing unit 200.

The baseband processor 10, the RF transceiver 20, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple Input Multiple Output (MIMO) or Multi-User MIMO (MU-MIMO) is used, the antenna unit 30 may include a plurality of antennas.

Figure 2:
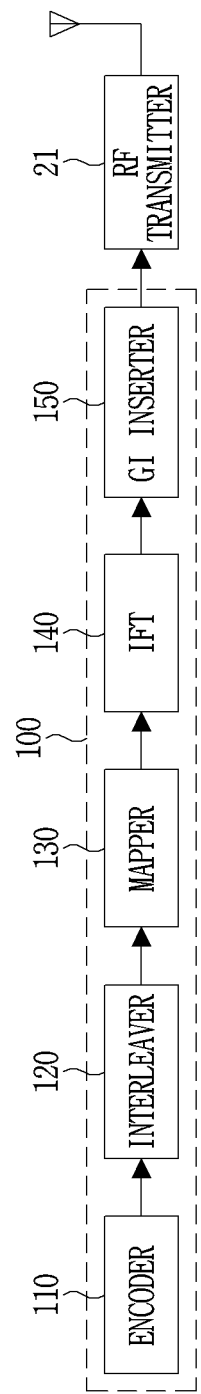
FIG. 2 is a schematic block diagram of an example transmitting signal processing unit in a WLAN.

FIG. 2 is a schematic block diagram of an example transmitting signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
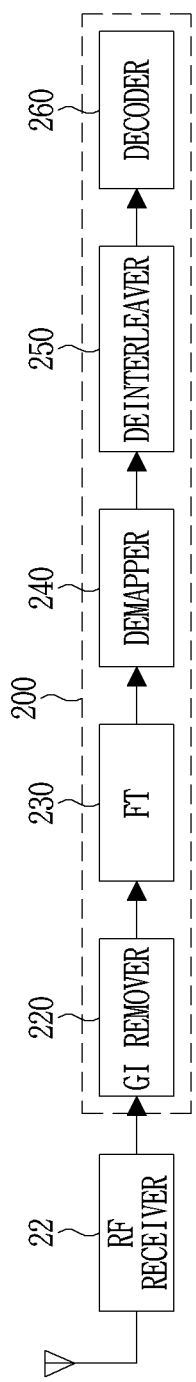
FIG. 3 is a schematic block diagram of an example receiving signal processing unit in a WLAN.

FIG. 3 is a schematic block diagram of an example receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into one or more symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may use/include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, or colloquially as a 'listen before talk' access mechanism. According to the CSMA/CA mechanism, an AP and/or a STA may sense a medium or a channel for a predetermined time before starting transmission, that is, the AP and/or the STA may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in less collisions.

Figure 4:
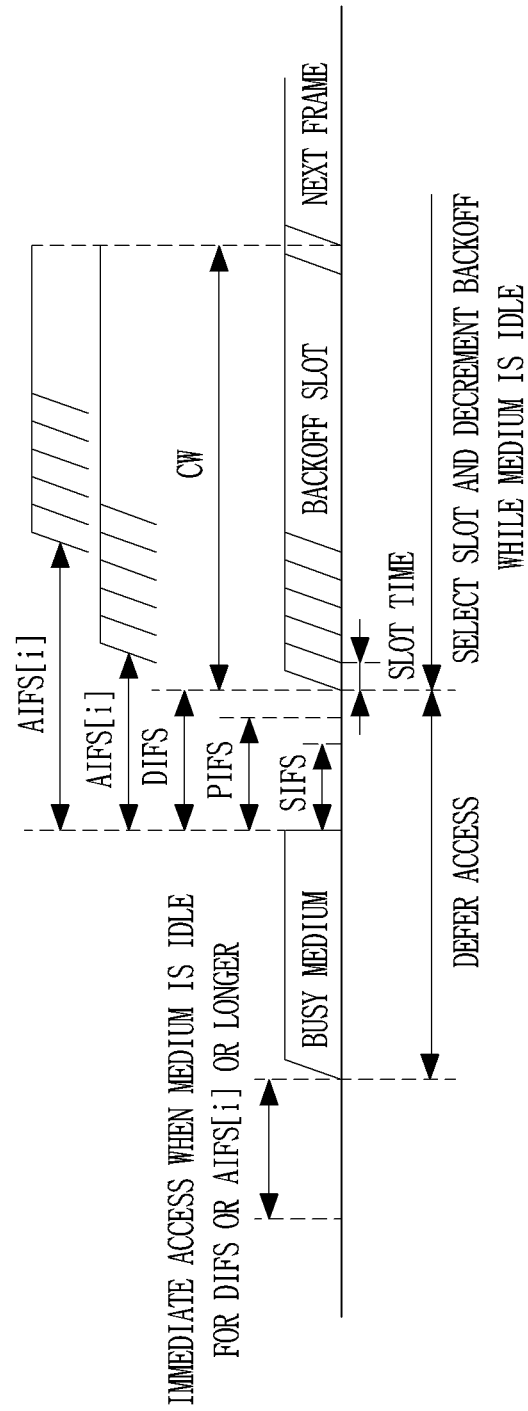
FIG. 4 depicts a relationship between InterFrame Spaces (IFSs).

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to a previous frame, the WLAN device transmits the control frame after performing backoff if the DIFS has elapsed. In case that the control frame is a response frame to a previous frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS or longer. The medium is busy for a time period during which the STA transmits the frame. During the time period, upon generation of a frame to be transmitted, another STA may defer access by confirming that the medium is busy. If the medium is idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempts transmission. The random backoff count is determined based on a Contention Window (CW) parameter and the medium is monitored continuously during countdown of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
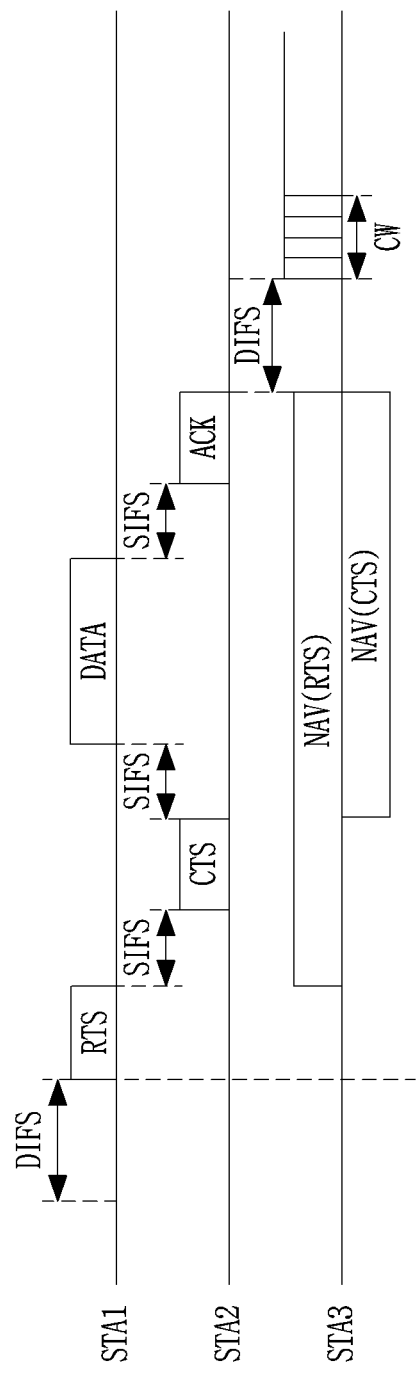
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
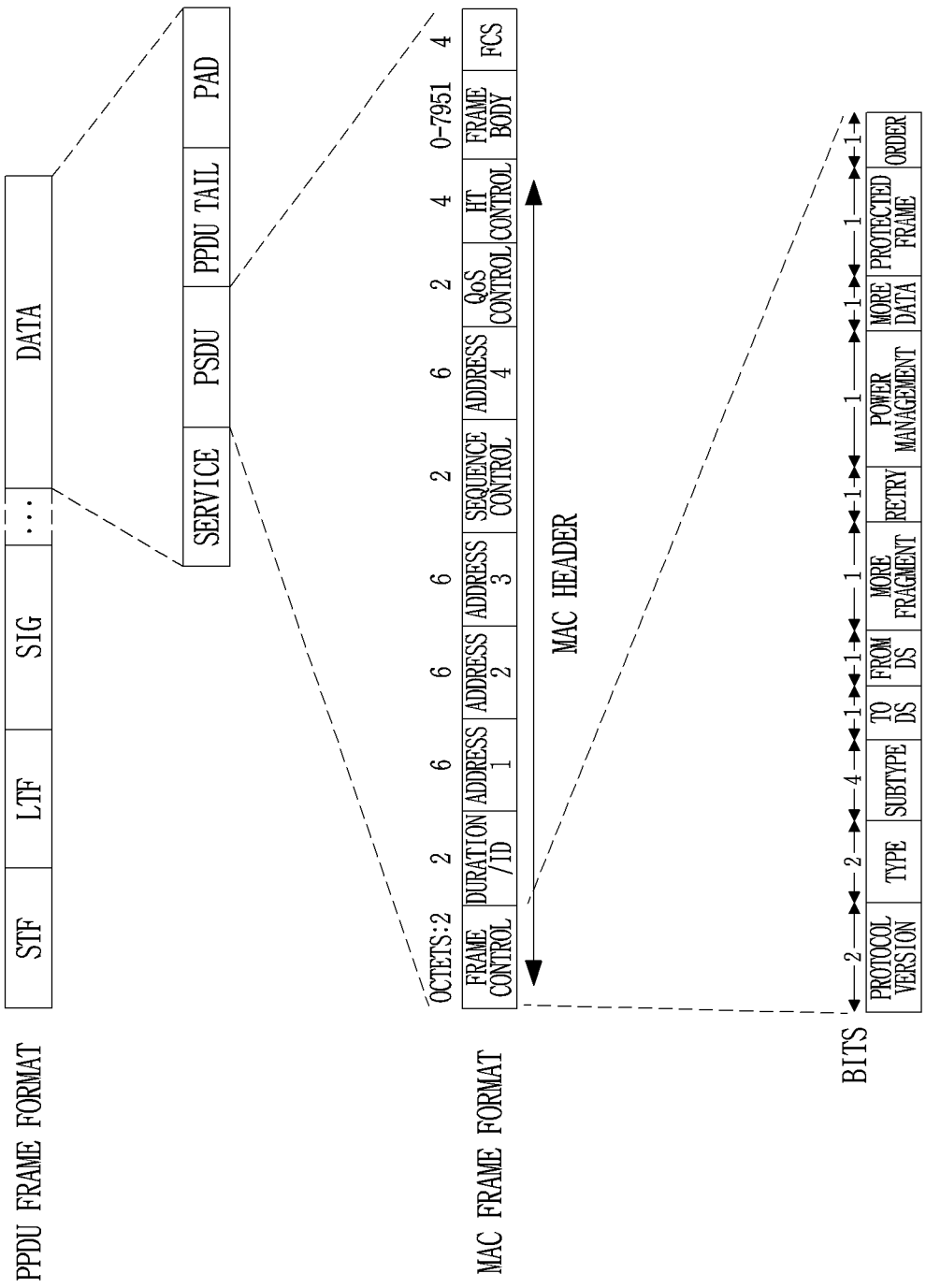
FIG. 6 depicts an example frame structure in a WLAN system.

FIG. 6 depicts an example frame structure in a WLAN system.

PHY layer may prepare for transmission of a MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. Some of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification, which is hereby incorporated by reference.

The Frame Control field of the MAC header may include Protocol Version, Type, Subtype, To Distribution System (DS), From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present disclosure, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
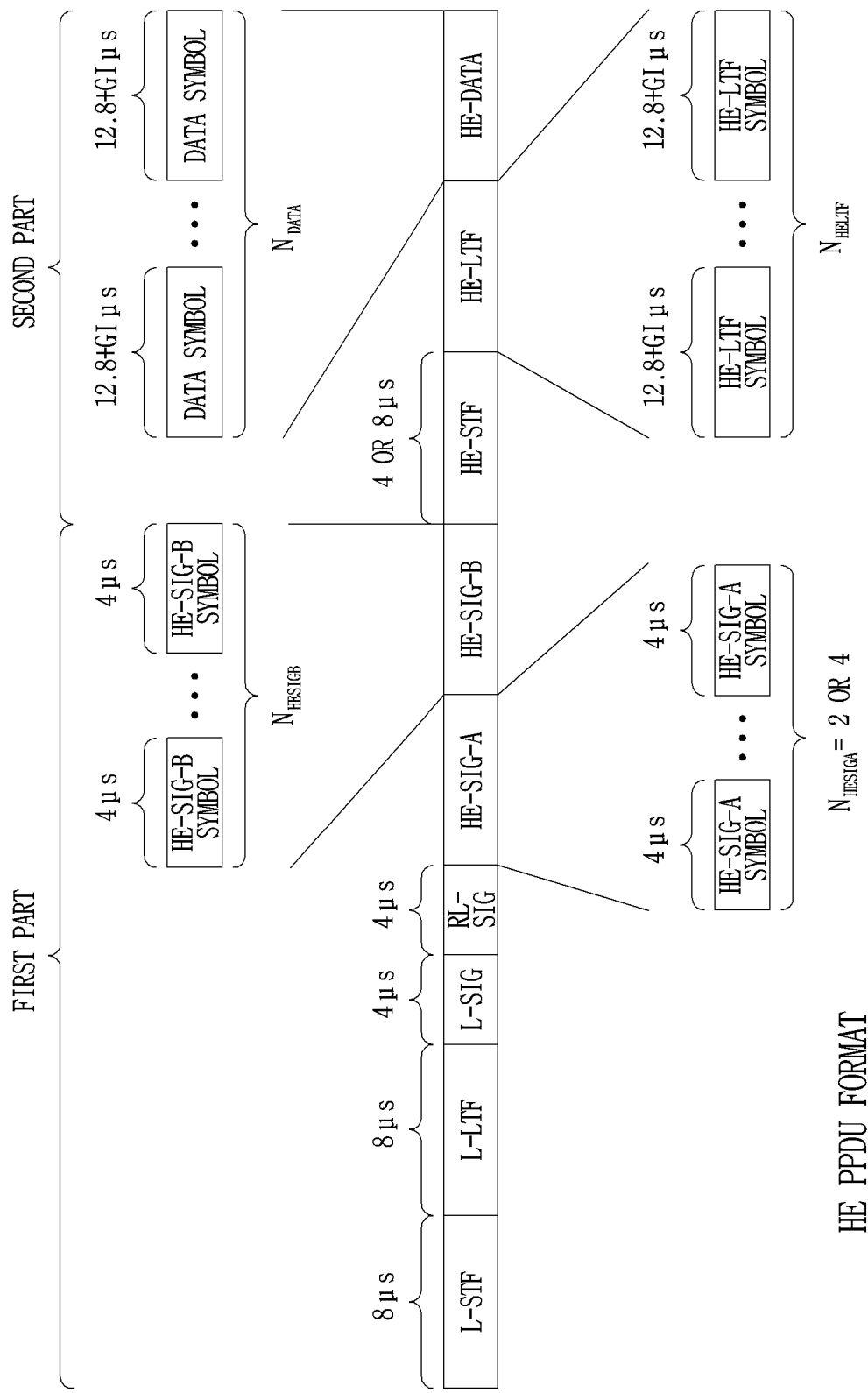
FIG. 7 depicts an example HE PPDU frame format.

FIG. 7 depicts an example HE PPDU frame format.

A transmitting STA may generate a PPDU frame according to the HE PPDU frame format as illustrated in FIG. 7 and transmit the PPDU frame to a receiving STA. The receiving STA may receive, detect, and process the PPDU.

The HE PPDU frame format may broadly include two parts: the first part including an L-STF field, an L-LTF field, an L-SIG field, a Repeated L-SIG (RL-SIG) field, an HE-SIG-A field, and an HE-SIG-B field and the second part including an HE-STF field, an HE-LTF field, and an HE-DATA field. 64-FFT based on a channel bandwidth of 20 MHz may be applied to the first part and a basic subcarrier spacing of 312.5 kHz and a basic DFT period of 3.2 μs may be included in the first part. 256-FFT based on a channel bandwidth of 20 MHz may be applied to the second part and a basic subcarrier spacing of 75.125 kHz and a basic DFT period of 12.8 μs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table I.

TABLE I

| Element | definition | duration | DFT period | GI | Subcarrier spacing | Description |
|---|---|---|---|---|---|---|
| Legacy(L)-STF | Non-high throughput(HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |

TABLE I-continued

| Element | definition | duration | DFT period | GI | Subcarrier spacing | Description |
|---|---|---|---|---|---|---|
| RL-SIG | Repeated Non-HT SIGNAL field | 4 µs | 3.2 µs | 0.8 µs | 312.5 kHz | |
| HE-SIG-A | HE SIGNAL A field | $N_{HESIGA}$ * 4 µs | 3.2 µs | 0.8 µs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 µs | 3.2 µs | 0.8 µs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 µs | — | — | non-trigger-based PPDU: (equivalent to) 1,250 kHz; trigger-based PPDU: (equivalent to) 625 kHz | HE-STF of a non-trigger-based PPDU has a periodicity of 0.8 µs with 5 periods. A non-trigger-based PPDU is not sent in response to a trigger frame. The HE-STF of a trigger-based PPDU has a periodicity of 1.6 µs with 5 periods. A trigger-based PPDU is an UL PPDU sent in response to a trigger frame. |
| HE-LTF | HE Long Training field | $N_{HELTF}$ * (DTF period + GI) µs | 2xLTF: 6.4 µs 4xLTF: 12.8 µs | supports 0.8, 1.6, 3.2 µs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 µs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DTF period + GI) µs | 12.8 µs | supports 0.8, 1.6, 3.2 µs | 78.125 kHz | $N_{DATA}$ means the number of HE data symbols. |

L-STF is a non-HT Short Training field and may have a duration of 8 µs and a subcarrier spacing equivalent to 1250 kHz. L-STF of a PPDU which is not based on a trigger may have a periodicity of 0.8 µs with 10 periods. Herein, the trigger corresponds to scheduling information for UL transmission.

L-LTF is a non-HT Long Training field and may have a duration of 8 µs, a DFT period of 3.2 µs, a Guard Interval (GI) of 1.6 µs, and a subcarrier spacing of 312.5 kHz.

L-SIG is a non-HT SIGNAL field and may have a duration of 4 µs, a DFT period of 3.2 µs, a GI of 0.8 µs, and a subcarrier spacing of 312.5 kHz.

RL-SIG is a Repeated Non-HT SIGNAL field and may have a duration of 4 µs, a DFT period of 3.2 µs, a GI of 0.8 µs, and a subcarrier spacing of 312.5 kHz.

L-STF, L-LTF, L-SIG, and RL-SIG may be called legacy preambles.

HE-SIG-A is an HE SIGNAL A field and may have a duration of $N_{HESIGA}$*4 µs, a DFT period of 3.2 µs, a GI of 0.8 µs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is an HE SIGNAL B field and may have a duration of $N_{HESIGB}$*4 µs, a DFT period of 3.2 µs, a GI of 0.8 µs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is an HE Short Training field and may have a duration of 4 or 8 µs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 µs with 4 periods. The non-triggered PPDU is not transmitted in response to a trigger field. HE-STF of the trigger based PPDU may have a periodicity of 1.6 µs with 5 periods. The trigger based PPDU is a UL PPDU transmitted in response to the trigger frame.

HE-LTF is an HE Long Training field and may have a duration of $N_{HELTF}$*(DFT period+GI) µs. $N_{HELTF}$ represents the number of HE-LTF symbols and may have a value of 1, 2, 4, 6, or 8. An HE PPDU may support a 2xLTF mode and a 4xLTF mode. In the 2xLTF mode, an HE-LTF symbol except for a GI is equivalent to a symbol obtained by modulating every other tone in an OFDM symbol of 12.8 µs excluding a GI and then eliminating the first half or the second half of the OFDM symbol in the time domain. In the 4×LTF mode, an HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2×LTF may have a DFT period of 6.4 μs and 4×LTF may have a DFT period of 12.8 μs. A GI of HE-LTF may support 0.8 μs, 1.6 μs, and 3.2 μs. 2×LTF may have a subcarrier spacing equivalent to 156.25 kHz and 4×LTF may have a subcarrier spacing of 78.125 kHz.

HE-DATA is an HE DATA field and may have a duration of, $N_{DATA}*(DFT\ period+GI)$μs. $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with example HE PPDU frame formats described below. For example, characteristics of fields exemplarily described below may be applied while a transmission order of the fields of the HE PPDU frame format of FIG. 7 is maintained.

Figure 8:
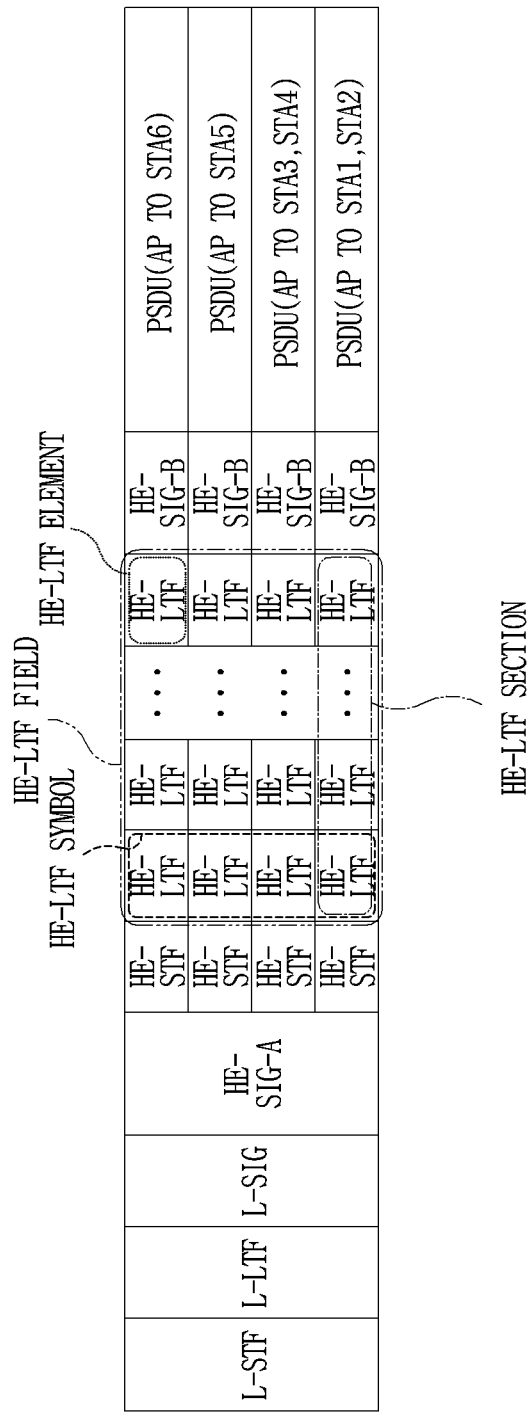
FIG. 8 depicts an example High Efficiency (HE) Physical layer Protocol Data Unit (PPDU) frame format according to the present disclosure.

FIG. 8 depicts an example HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz). An HE-STF and an HE-LTF may be transmitted on each basic subchannel unit (e.g., 5 MHz)), and an HE-SIG-B and a PSDU may be transmitted on each of the subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may also be referred to as Resource Unit (RU) or subband. In particular, terms like OFDMA subchannel, OFDMA RU, OFDMA subband can be used as synonyms for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel A subchannel refers to a frequency band allocated to a STA and a basic subchannel unit refers to a basic unit used to represent the size of a subchannel. While the size of the basic subchannel unit is 5 MHz in the above example, this is purely example Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, an HE-LTF element may be referred to shortly as an HE-LTF.

An HE-LTF symbol may correspond to a set of HE-LTF elements in one OFDM symbol in time domain and in one channel unit (e.g., 20 MHz) in frequency domain.

An HE-LTF section may correspond to a set of HE-LTF elements in one or more OFDM symbols in time domain and in one subchannel unit (i.e., a subchannel bandwidth allocated to a STA) in frequency domain.

An HE-LTF field may be a set of HE-LTF elements, HE-LTF symbols, or HE-LTF sections for a plurality of STAs.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., a third-party STA is not allowed to transmit during a certain period based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at an HE STA (or HEW STA). The set of parameters included in the HEW SIG-A field may include one or more of Very High Throughput (VHT) PPDU modulation parameters transmitted by IEEE 802.11ac stations, as listed in Table II below, to ensure backward compatibility with legacy STAs (e.g., IEEE 802.11ac stations).

TABLE II

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, |

TABLE II-continued

| Two parts of VHT-SIG-A | Bit | Field | Number of bits | Description |
|---|---|---|---|---|
| | | | | uses bits B(10 + 3 p) to B(12 + 3 p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS Field is 0, then B4 is reserved and sct to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE—If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-S1G-A2, respectively. |

TABLE II-continued

| Two parts of VHT-SIG-A | Bit | Field | Number of bits | Description |
|---|---|---|---|---|
| | B18-B23 | Tail | 6 | Used to terminate the trellis of the convolutional decoder. Set to 0. |

Table II illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification, which is hereby incorporated by reference. In the HE PPDU frame format of the present disclosure, the HE-SIG-A field may include one or more of the fields included in the VHT-SIG-A field, and it may provide backward compatibility with IEEE 802.11ac stations.

Figure 9:
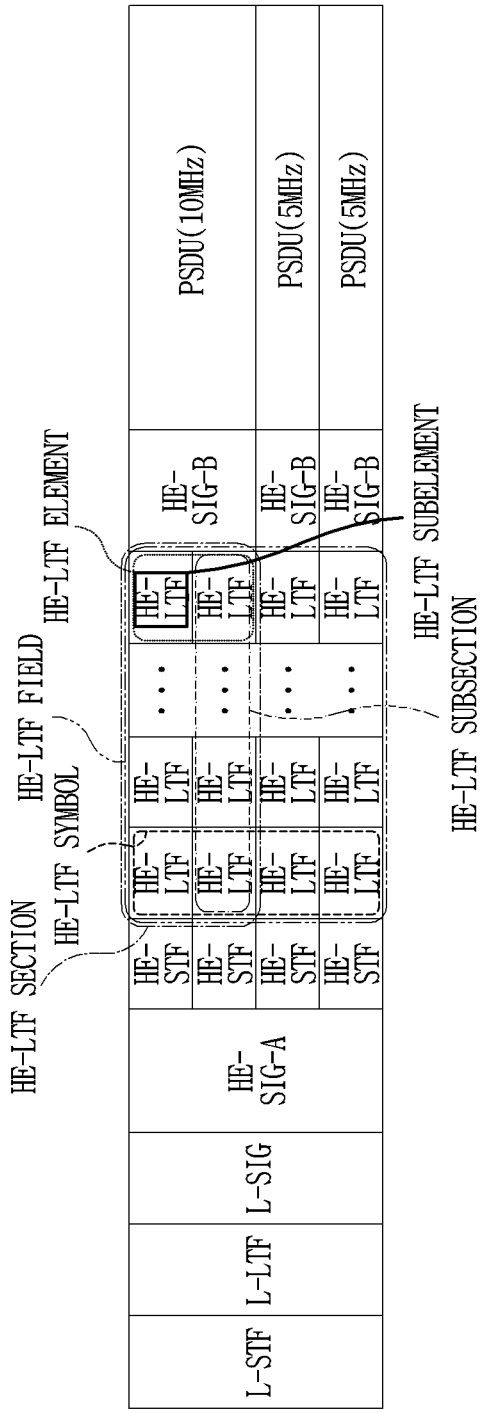
FIG. 9 depicts subchannel allocation in an HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and an HE-SIG-A may be transmitted per channel (e.g., 20 MHz), an HE-STF and an HE-LTF may be transmitted on each basic subchannel unit (e.g., 5 MHz), and an HE-SIG-B and a PSDU may be transmitted on each of the subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice the size of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel (i.e., 10-MHz subchannel, allocated to STA4). An HE-LTF element and an HE-LTF subelement are logical units and the PHY layer does not always operate in units of an HE-LTF element or HE-LTF subelement.

An HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

An HE-LTF section may correspond to a set of HE-LTF elements in one or more OFDM symbols in the time domain and one subchannel unit (i.e. the bandwidth of a subchannel allocated to a STA) in the frequency domain. An HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel (i.e., 10-MHz subchannel, allocated to STA4).

An HE-LTF field may correspond to a set of HE-LTF elements (or subelements), HE-LTF symbols, or HE-LTF sections (or subsections) for a plurality of STAs.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to a STA.

Figure 10:
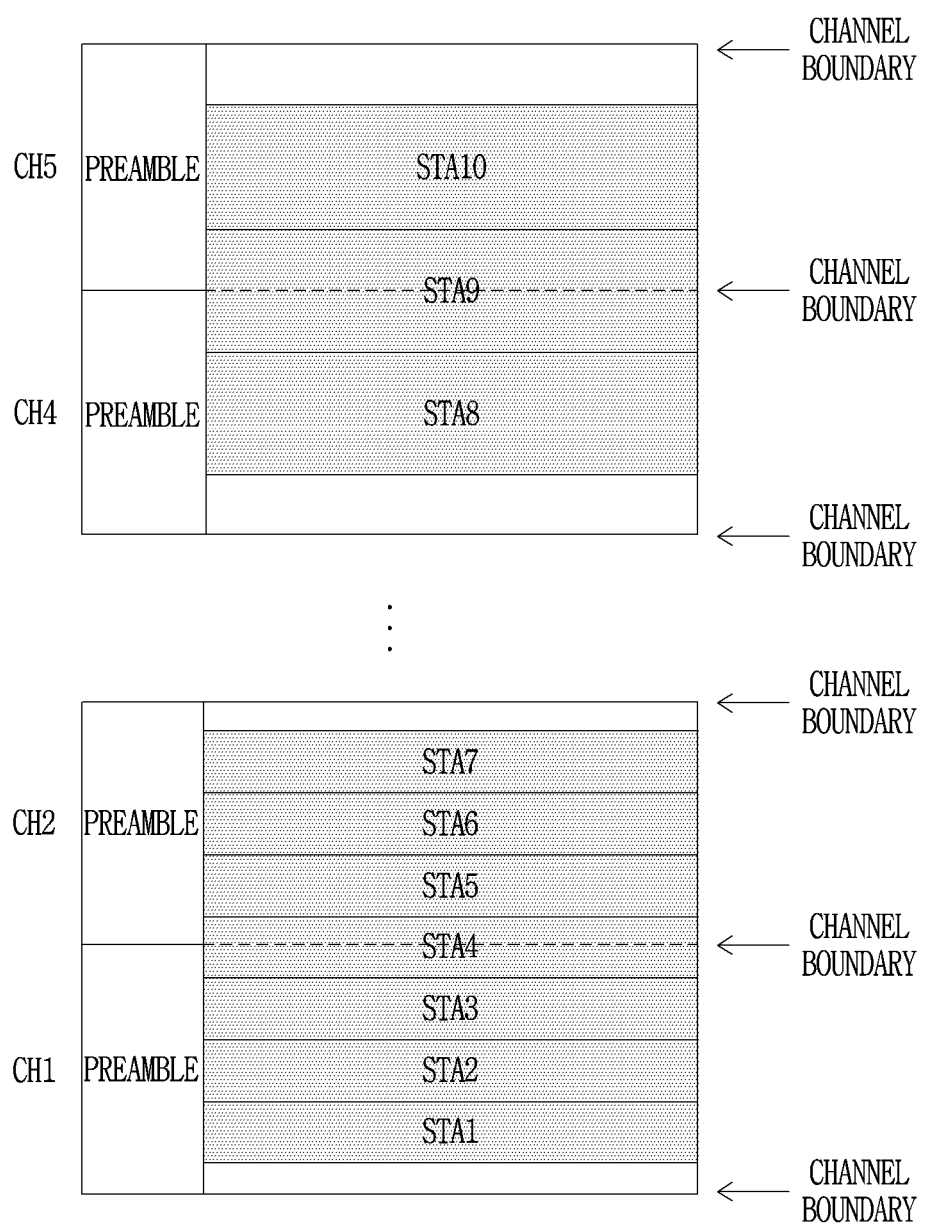
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and an HE-SIG-A as illustrated in the examples of FIGS. 8 and 9.

A subchannel for each HE STA may be allocated within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels, each having double the size (e.g., 10 MHz) of the basic subchannel unit in CH4 and CH5, are allocated to STA8, STA9, and STA10.

As illustrated in the lower part of FIG. 10, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to two channels). In the foregoing example of the present disclosure, the subchannel allocation to STA4 is not allowed.

As illustrated in the upper part of FIG. 10, although a subchannel allocated to STA8 or STA10 is fully overlapped only with one channel (i.e., without crossing the channel boundary, or belonging only to one channel), a subchannel allocated to STA9 is partially overlapped with two channels (i.e., crossing the channel boundary, or belonging to two channels). In the foregoing example of the present disclosure, the subchannel allocation to STA9 is not allowed.

On the other hand, in some embodiments, it may be allowed to allocate a subchannel partially overlapped between a plurality of channels (i.e., crossing the channel boundary, or belonging to two or more channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

FIG. 11 depicts the starting and ending points of an HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to an HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in additional detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, an HE-STF, an HE-LTF, an HE-LTF, an HE-LTF, an HE-LTF, and an HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel Since the subchannel carries four spatial streams, as many HE-LTFs (i.e., HE-LTF symbols or HE-LTF elements in an HE-LTF section) as the number of the spatial streams, that is, four HE-LTFs are transmitted to support MU-MIMO transmission.

According to an example of the present disclosure, the relationship between a total number of spatial streams transmitted on one subchannel and a number of HE-LTFs is listed in Table III.

TABLE III

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to Table III as an example, if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number that is 1 larger than the number of the spatial streams need to be transmitted.

Referring to FIG. 11 again, it is assumed that the second 5-MHz subchannel is allocated to STA3 and STA4 and one spatial stream per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, an HE-STF, an HE-LTF, an HE-LTF, an HE-LTF, an HE-LTF, and an HE-SIG-B follow the HE-SIG-A field on the subchannel (i.e., four HE-LTFs are transmitted). This is for the purpose of setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby disrupting orthogonality (i.e., orthogonality is not maintained). To overcome this problem, an additional constraint needs to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the number of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the number of HE-LTFs (HE-LTF symbols or HE-LTF elements in an HE-LTF section) required according to the total number of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that an HE-LTF field starts at the same time point and ends at the same time point in an HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to Table III). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting an HE PPDU frame in the MU-MIMO or OFDMA mode, a transmitter may generate P (where P is an integer equal to or larger than 1) HE-LTF symbols (refer to FIG. 8) and transmit an HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e., P) of another subchannel. Also, the number of HE-LTF elements (i.e., P) included in an HE-LTF section in one of the Q subchannels may be equal to the number of HE-LTF elements (i.e., P) included in an HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or STAs).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are not actually used for channel estimation at the STAs.

FIG. 12 depicts an HE-SIG-B field and an HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, an HE-SIG-A field. An HE-SIG-B field may include spatial stream allocation information about one subchannel. Also, an HE-SIG-C field may be transmitted after transmission of HE-LTFs, including Modulation and Coding Scheme (MCS) information about a PSDU and information about the length of the PSDU, etc.

Figure 13:
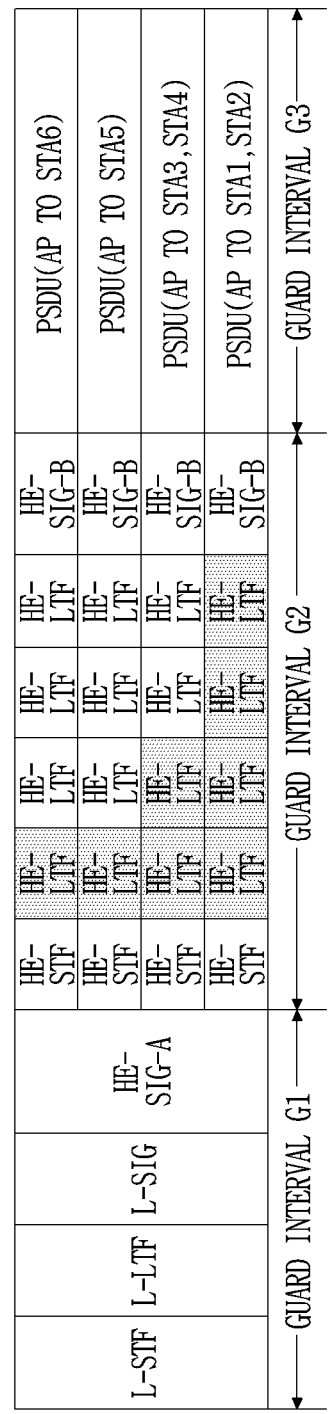
FIG. 13 depicts another example of an HE PPDU frame format according to the present disclosure.

FIG. 13 depicts OFDM symbol durations and GI lengths in the HE PPDU frame format according to the present disclosure.

In the HE PPDU frame format according to the present disclosure, L-STF, L-LTF, L-SIG, and HE-SIG-A fields may be configured with 4.0-µs OFDM symbols based on 64-FFT. One OFDM symbol has a GI of 0.8 µs. In the present disclosure, a GI value applied to the L-STF, L-LTF, L-SIG, and HE-SIG-A fields is defined as G1. The L-STF, L-LTF, L-SIG, and HE-SIG-A fields may include 3.2-µs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 µs and a subcarrier spacing of 312.5 kHz.

The following HE-STF, HE-LTF, HE-SIG-B, and PSDU fields may include 16-µs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-µs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 µs and a subcarrier spacing of 78.125 kHz.

The values of G2 and G3 may be equal or different. If G2 and G3 are equal, G2 and G3 may be defined as one parameter without distinguishing between G2 and G3. In one embodiment, unlike G1, G2 and G3 may vary according to a transmitted PPDU transmission vector, rather than being fixed values (i.e., predetermined values). This is because the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 µs, G2 may be a value selected from 3.2 µs, 1.6 µs, 0.8 µs, and 0.4 µs, and G3 may be a value selected from among 3.2 µs, 1.6 µs, 0.8 µs, and 0.4 µs. Also, G1 may have a fixed value (i.e., a predetermined value) of 0.8 µs, and G2 or G3 may be a value selected or determined from among 3.2 µs, 1.6 µs, 0.8 µs, and 0.4 µs. In one embodiment, G1 does not require separate signaling because G1 is a fixed value, and signaling information indicating G2 and G3 may be provided to an HE STA in the HE-SIG-A field.

In one embodiment, G2 and G3 are applied commonly across all OFDM symbols transmitted during a corresponding time period and across all subchannels. Accordingly, PSDU transmission timings and OFDM symbol timings may be synchronized. For example, it may not be allowed to apply a 3.2-µs G2 value to a subchannel and a 1.6-µs or 0.8-µs G2 value to another subchannel during a specific time period. Rather, the same 3.2-µs G2 value may be applied to the subchannels during the same time period. In a similar example, it may not be allowed to apply a 1.6-µs G3 value to a subchannel and a 3.2-µs or 0.8-µs G3 value to another subchannel during a specific time period. Rather, the same 1.6-µs G3 value may be applied to the subchannels during the same time period.

In the case where an HE PPDU frame format having HE-LTF sections of different lengths for subchannels is used (i.e., in the case where the number of HE-LTFs is not determined for each subchannel based on the maximum of the number of HE-LTFs required according to the total number of spatial streams transmitted on each subchannel in a set of HE STAs allocated to each of subchannels, as described in the example of FIG. 11), if the values of G2 and G3 are different, PSDUs are transmitted on different subchannels at different time points and OFDM symbol timings are not synchronized. Therefore, values of G2 and G3 may need to be selected or determined as a same value.

In the case where an HE PPDU frame format having HE-LTF sections of the same length for subchannels is used (i.e., in the case where the number of HE-LTFs is determined for each subchannel based on the maximum of the numbers of HE-LTFs required according to the total number of spatial streams transmitted on each subchannel in a set of HE STAs allocated to each of subchannels, as described in the example of FIG. 11), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the present disclosure does not exclude that values of G2 and G3 may be selected or determined as a same value.

In the example of FIG. 13, OFDM symbol durations S1, S2, and S3 may be applied respectively to time periods to which the GIs G1, G2, and G3 are applied.

Figure 14:
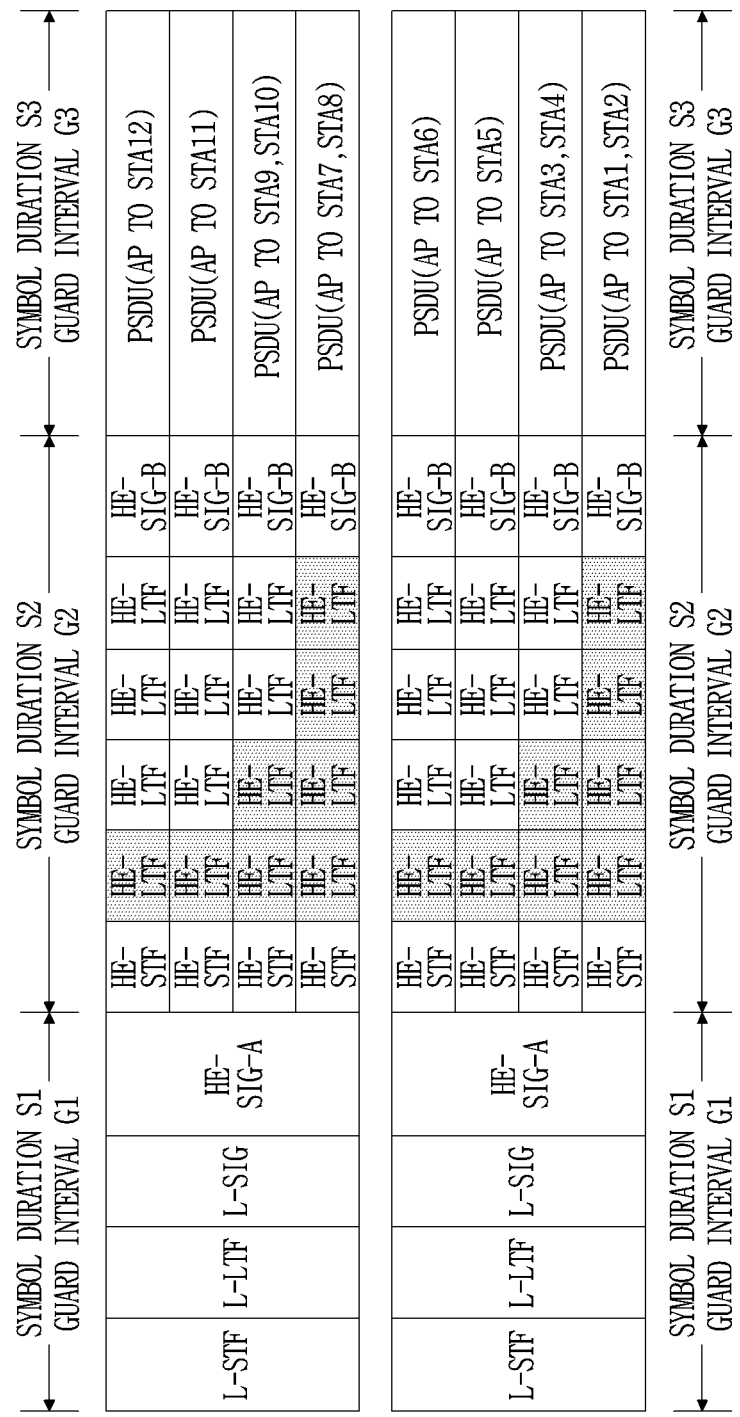
FIG. 14 depicts an example HE PPDU frame format for a wide channel band according to the present disclosure.

FIG. 14 depicts an example HE PPDU frame format for a wide channel band according to the present disclosure.

Referring to FIG. 14, the HE PPDU frame format for one 20-MHz channel illustrated in the example of FIG. 13 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 13 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs.

From this viewpoint, the example described with reference to FIG. 11 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO-mode or OFDMA-mode transmission, thus maintaining orthogonality. This channel-based example will be described below.

Basically in SU-MIMO-mode or non-OFDMA-mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO-mode or OFDMA-mode transmission. Therefore, the numbers of HE-LTFs on all other subchannels over one or more 20-MHz channels may be determined based on a subchannel having a maximum number of streams among all subchannels over one or more 20-MHz channels in MU-MIMO-mode or OFDMA-mode transmission.

Specifically, the number of HE-LTFs to be transmitted on all subchannels may be determined according to the maximum of the number of HE-LTFs required according to the total numbers of spatial streams transmitted on each subchannel over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that an HE-LTF field starts at the same time point and ends at the same time point on all subchannels over one or more 20-MHz channels for all users (i.e., HE STAs) in MU-MIMO-mode or OFDMA-mode transmission of an HE PPDU. Or it may be said that the lengths of HE-LTF sections are equal on all subchannels over one or more 20-MHz channels for all HE STAs in MU-MIMO-mode or OFDMA-mode transmission. Or it may be said that the number of HE-LTF elements included in each HE-LTF section is equal in all subchannels over one or more 20-MHz channels for all HE STAs in MU-MIMO-mode or OFDMA-mode transmission. Accordingly, PSDU transmission timings may be synchronized between all subchannels over one or more 20-MHz channels for all HE STAs in MU-MIMO-mode or OFDMA-mode transmission.

In FIG. 14, the OFDM symbol duration and GI of L-STF, L-LTF, L-SIG, and HE-SIG-A fields on the first 20-MHz channel are S1 and G1, respectively. Like the first 20-MHz channel, the second 20-MHz channel has S1 and G1 respectively as the OFDM symbol duration and GI of L-STF, L-LTF, L-SIG, and HE-SIG-A fields.

In FIG. 14, the OFDM symbol duration and GI of an HE-STF field, a plurality of HE-LTFs, and an HE-SIG-B field on the first 20-MHz channel are S2 and G2, respectively. Like the first 20-MHz channel, the OFDM symbol duration and GI of an HE-STF field, a plurality of HE-LTFs, and an HE-SIG-B field on the second 20-MHz channel are also S2 and G2, respectively.

In FIG. 14, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively.

This example it is shown that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modified example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel may be the same fixed values in every 20-MHz channel.

Further, this modified example may include application of the example described before with reference to FIG. 11 in which 'subchannels have the same HE-LTF section length' only to subchannels within one 20-MHz channel, not to the HE-LTF section length of subchannels in another 20-MHz channel.

With reference to the foregoing examples of the present disclosure, mainly the features of an HE PPDU frame structure applicable to a DL MU-MIMO-mode or OFDMA-mode transmission that an AP transmits simultaneously to a plurality of STAs has been described. Now, a description will be given of the features of an HE PPDU frame structure applicable to a UL MU-MIMO-mode or OFDMA-mode transmission that a plurality of STAs transmit simultaneously to an AP.

The above-described various examples of structures of the HE PPDU frame format supporting MU-MIMO-mode or OFDMA-mode transmission should not be understood as applicable only to DL without being applicable to UL. Rather, the examples should be understood as also applicable to UL. For example, the above-described example HE PPDU frame formats may also be used for a UL HE PPDU transmission that a plurality of STAs simultaneously transmit to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to an HE STA allocated to each of a plurality of subchannels. Therefore, the AP may include, in an HE-SIG-A field or an HE-SIG-B field, information about the total number of spatial streams transmitted across a channel, a maximum number of spatial streams (i.e., information being a basis of the number of HE-LTF elements (or the starting point and ending point of an HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmit to an AP, each STA being a transmission entity may only be aware of the number of spatial streams in an HE PSDU that it will transmit, without knowledge of the number of spatial streams in an HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, an HE PPDU frame format applicable to a UL MU-MIMO or OFDMA mode may be configured without modification to an example HE PPDU frame format applied to a DL MU-MIMO or OFDMA mode. For example, each STA may configure an HE PPDU frame format by including information about the number of spatial streams across a channel in an HE-SIG-A field, determining the number of HE-LTF elements (or the starting point and ending point of an HE-LTE section) on each subchannel according to the maximum number of spatial streams, and including information about the number of spatial streams for the individual STA in an HE-SIG-B field.

Alternatively, if the STAs operate according to the common/individual parameters received in the trigger frame from the AP, each STA does not need to indicate the common/individual parameters to the AP during an HE PPDU transmission. Therefore, this information may not be included in an HE PPDU. For example, each STA may determine the total number of spatial streams, the maximum number of spatial streams, and the number of spatial streams allocated to individual STA, as indicated by the AP, and configure an HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Band-Width (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before an HE-LTF field because the number of spatial streams and the information indicating whether STBC is used or not are significant to determination of configuration information about a preamble and a PSDU in an HE PPDU frame format (e.g., the number of HE-LTF elements is determined according to a combination of the number of spatial streams and the information indicating whether STBC is used or not). For this purpose, an HE PPDU frame format as illustrated in FIG. 15 may be used for a UL HE PPDU transmission.

FIG. 15 depicts another example HE PPDU frame format according to the present disclosure. The HE PPDU frame format illustrated in FIG. 15 is characterized in that a structure of HE-SIG-A, HE-SIG-B, and HE-SIG-C fields similar to that in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of an HE-SIG-B field, an HE-SIG-C field, and a first HE-LTF element (i.e., an HE-LTF between an HE-STF field and an HE-SIG-B field) illustrated in FIG. 15 may not be present. In this case, a description of each field given below may be applicable only in the presence of the field.

In the example of FIG. 15, an HE-SIG-A field is transmitted per channel (i.e., per 20-MHz channel) and may include transmission parameters common to simultaneously transmitted HE PSDUs. Since the same information is transmitted in the fields from the L-STF to HE-SIG-A in UL PPDUs transmitted by HE STAs allocated to subchannels, the AP may receive the same signals from the plurality of STAs successfully.

An HE-SIG-B field is transmitted per subchannel in one channel. The HE-SIG-B field may have an independent parameter value according to the transmission characteristics of an HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

An HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similar to DL MU-MIMO-mode or OFDMA-mode HE PPDU transmission, if transmission of PSDUs start at different time points on subchannels in UL MU-MIMO-mode or OFDMA-mode HE PPDU transmission, and if OFDM symbols are not aligned accordingly, then the implementation complexity of an AP that receives a plurality of PSDUs is increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

In the HE PPDU frame format supporting UL MIMO-mode or OFDMA-mode transmission illustrated in FIG. 15, the L-STF, L-LTF, L-SIG, and HE-SIG-A fields may include 4.0-μs OFDM symbols based on 64-FFT. One OFDM symbol has a GI of 0.8 μs. In the present description, a GI value applied to the L-STF, L-LTF, L-SIG, and HE-SIG-A fields is defined as G1. Excluding the GI, the L-STF, L-LTF, L-SIG, and HE-SIG-A fields may be configured as 3.2-μs OFDM symbols based on 64-FFT.

In the example of FIG. 15, an HE-STF field, an HE-LTF field, an HE-SIG-B field, HE-LTF elements(s) in an HE-LTF section, an HE-SIG-C field and a PSDU may include 16-μs OFDM symbols based on 256-FFT. The OFDM symbol duration may be changed according to a GI value. Two types of GI values may be defined for one OFDM symbol for different time periods. A GI value applied to the OFDM symbols of the HE-STF field, the HE-LTF field, the HE-SIG-B field, the HE-LTF elements(s) in the HE-LTF section, and the HE-SIG-C field is defined as G2 and a GI value applied to the OFDM symbols of the PSDU is defined as G3. Excluding the GIs, the HE-STF field, the HE-LTF field, the HE-SIG-B field, and the PSDU may include 12.8-μs OFDM symbols based on 256-FFT.

The values of G2 and G3 may be equal or different. If G2 and G3 are equal, G2 and G3 may be defined as one parameter without distinguishing G2 from G3. In one embodiment, unlike G1, G2 and G3 may vary according to each transmitted PPDU transmission vector, rather than being fixed values (i.e. predetermined values known to both a transmitter and a receiver). This is because the lengths of the HE-STF, the HE-LTF, the HE-SIG-B, the HE-LTF element(s) in an HE-LTF section, and the HE-SIG-C to which G2 is applied may vary according to a PPDU transmission vector and the length of the PSDU to which G3 is applied may also vary according to the PPDU transmission vector.

In another example, the G1 applied to the L-STF, L-LTF, L-SIG, and HE-SIG-A fields (to which 64-FFT is applied) may be a fixed value (i.e., a predefined value known to both a transmitter and a receiver) and one of G2 and G3 (if G2 and G3 are equal, they may be defined as one parameter) applied to the following fields (i.e., the HE-STF, HE-LTF, HE-SIG-B, HE-SIG-C, and PSDU to which 256-FFT is applied) may be configured or indicated as a variable value (e.g., one of 3.2 μs, 1.6 μs, 0.8 μs, and 0.4 μs).

More specifically, G1 may have a fixed value (i.e. a predefined value known to both a transmitter and a receiver) of 0.8 μs, G2 may be a value selected or indicated from among 3.2 μs, 1.6 μs, 0.8 μs, and 0.4 μs, and G3 may be a value selected or indicated from among 3.2 μs, 1.6 μs, 0.8 μs, and 0.4 μs. Also, G1 may be a fixed value (i.e. a predefined value known to both a transmitter and a receiver) of 0.8 μs, and G2 or G3 may be a value selected or indicated from among 3.2 μs, 1.6 μs, 0.8 μs, and 0.4 μs. G1 does not require signaling because G1 is a fixed value, and signaling information indicating G2 and G3 may be provided to the AP. If an HE STA performs UL transmission according to triggering of the AP (or based on parameters provided by the AP), the HE-STA does not need to indicate the value of G2 or G3 to the AP.

G2 and G3 are applied commonly across all OFDM symbols transmitted during a corresponding time period and across all subchannels. Accordingly, PSDU transmission timings may be synchronized, and OFDM symbol timings may be synchronized. For example, it is not allowed that a 3.2-μs G2 value is applied to a subchannel during a specific time period, while a 1.6-μs or 0.8-μs G2 value is applied to other subchannels during the same time period. Rather, the same 3.2-μs G2 value may be applied to other subchannels during the same time period. In a similar example, it is not allowed that a 1.6-μs G3 value is applied to a subchannel during a specific time period, while a 3.2-μs or 0.8-μs G3 value is applied to other subchannels during the same time period. Rather, the same 1.6-μs G3 value may be applied to other subchannels during the same time period.

In the case where an HE PPDU frame format having HE-LTF sections of different lengths for subchannels is used (i.e., in the case where 'the number of HE-LTFs is not determined for each subchannel based on the maximum of the numbers of HE-LTFs required according to the total numbers of spatial streams transmitted on subchannels in a set of HE STAs allocated to each of the subchannels'), if the values of G2 and G3 are different, a PSDU is transmitted on each subchannel at a different time point and OFDM symbol timings are not synchronized. Therefore, the same values for G2 and G3 may need to be selected or indicated in this case.

In the case where an HE PPDU frame format having HE-LTF sections of the same length for subchannels is used (i.e., in the case where 'the number of HE-LTFs is determined for each subchannel based on the maximum of the numbers of HE-LTFs required according to the total numbers of spatial streams transmitted on subchannels in a set of HE STAs allocated to each of the subchannels'), even though the values of G2 and G3 are different, PSDUs are transmitted on the subchannels at the same time point, without causing discrepancy between OFDM symbol timings. Therefore, selection or indication of different values for G2 and G3 does not cause a problem. However, even in this case, selection or indication of the same values for G2 and G3 is not excluded.

In the example of FIG. 15, OFDM symbol durations S1, S2, and S3 may be applied respectively to time periods to which the GIs G1, G2, and G3 are applied.

As described before, a plurality of STAs may simultaneously transmit PSDUs in an HE PPDU frame format on their allocated subchannels or on their allocated spatial streams to an AP (i.e., UL OFDMA transmission or MU-MIMO, hereinafter, referred to as "UL MU transmission") and may simultaneously receive PSDUs in the HE PPDU frame format on their allocated subchannels on their allocated spatial streams from the AP (i.e., DL OFDMA transmission or MU-MIMO transmission, hereinafter, referred to as "DL MU transmission").

Figure 16:
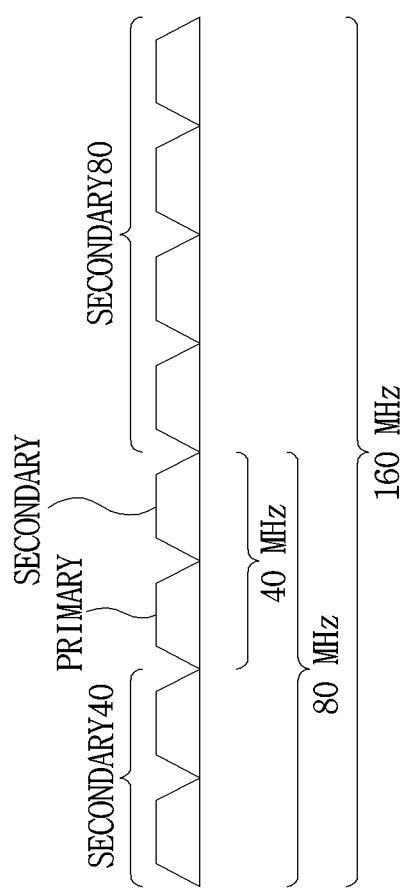
FIGS. 16 and 17 depict operating channels in a WLAN system.
Figure 17:
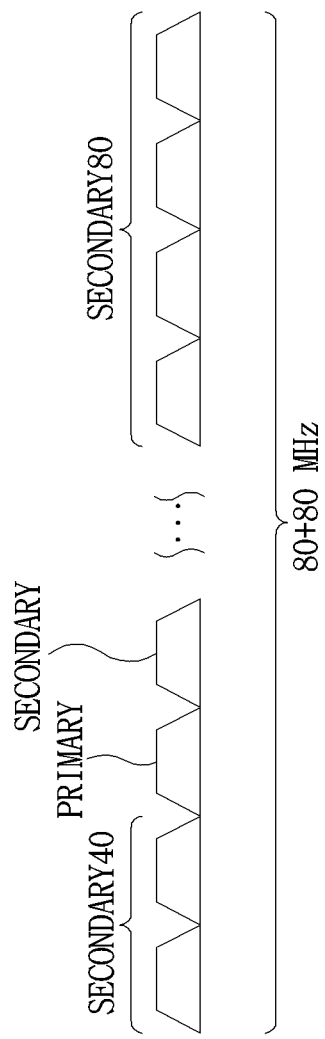

FIGS. 16 and 17 depict operating channels in a WLAN system.

Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 16). Further, the WLAN system may support a BSS operating channel having a bandwidth of 160 MHz including non-contiguous 80-MHz channels (called a bandwidth of 80+80 MHz) (refer to FIG. 17).

As illustrated in FIG. 16, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 17, one 80+80-MHz channel may include a primary 80-MHz channel and a secondary 80-MHz channel which are non-contiguous.

A primary channel is defined as a common channel for all STAs within a BSS. The primary channel may be used for transmission of a basic signal such as a beacon. The primary channel may also be a basic channel used for transmission of a data unit (e.g., a PPDU). If a STA uses a channel width larger than the channel width of the primary channel, for data transmission, the STA may use another channel within a corresponding channel, in addition to the primary channel. This additional channel is referred to as a secondary channel.

Now, a description will be given of a frame exchange method in which one or more STAs transmit UL frames in response to a DL frame transmitted by an AP.

Figure 18:
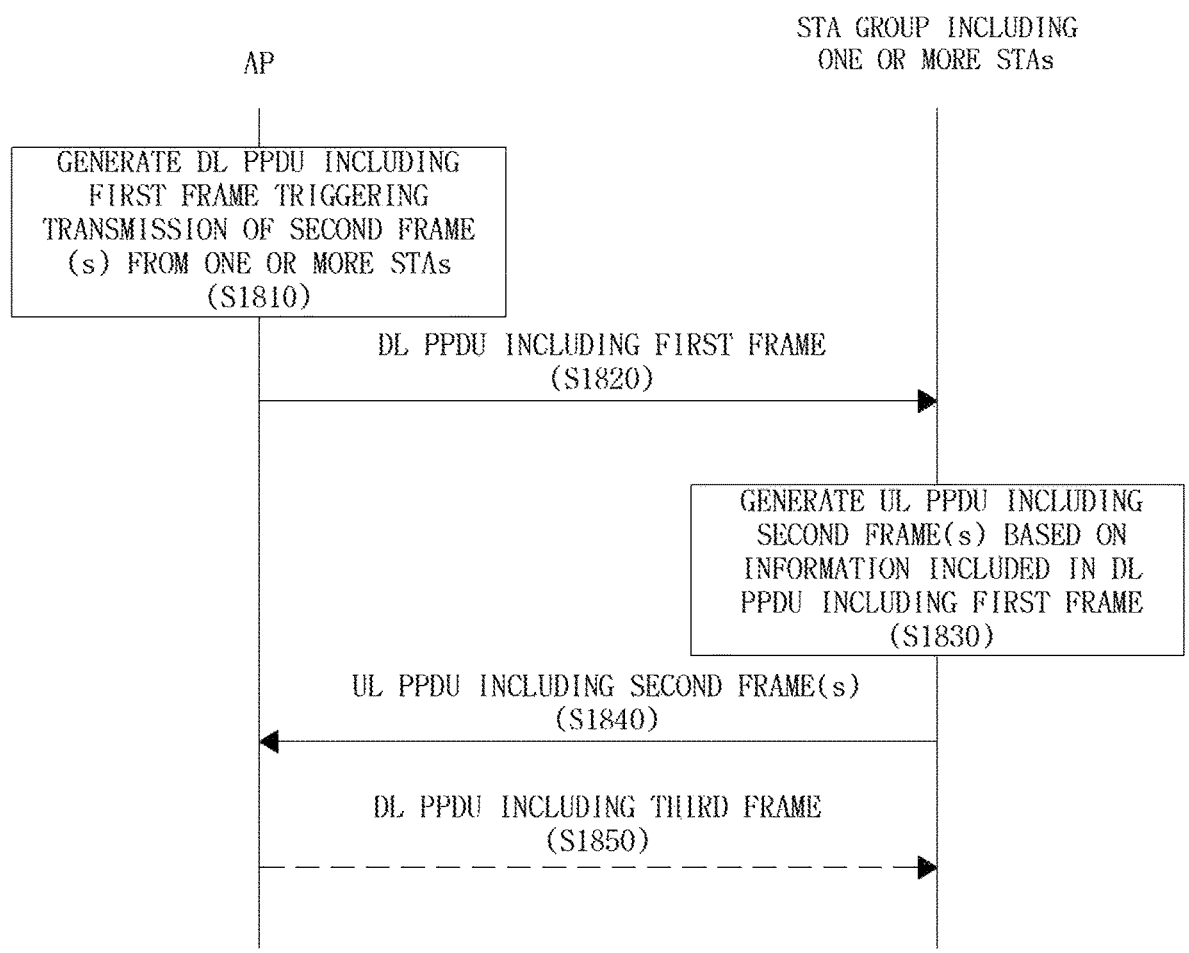
FIG. 18 is a diagram illustrating a signal flow for a method for exchanging a DL frame and a UL frame according to the present disclosure.

FIG. 18 is a diagram illustrating a signal flow for a method for exchanging a DL frame and a UL frame according to the present disclosure.

In step S1810, to transmit to one or more STAs a first frame having information triggering transmission of second frames from the one or more STAs, an AP may generate a DL PPDU including the first frame.

The first frame may be a frame eliciting, soliciting, or triggering a second frame. That is, the second frame may correspond to a trigger-based frame triggered by the first frame, or an immediate response frame in response to the first frame.

The DL PPDU including the first frame may further include information indicating whether the type of a PPDU carrying the second frame is SU PPDU or MU PPDU. Related specific examples will be described later with reference to FIGS. 19 and 20.

Further, the AP may use an HE PPDU format or a non-HE PPDU format (e.g., a NON-HT PPDU format) in order to transmit the DL PPDU including the first frame. Related specific examples will be described later with reference to FIGS. 22, 23, and 24.

Also, the DL PPDU including the first frame may include information indicating the type of an HE-LTF (e.g., compressed HE-LTF or uncompressed HE-LTF) in the UL PPDU carrying the second frame. Related specific examples will be described later with reference to FIGS. 25 and 26.

The DL PPDU including the first frame may also include information about the length of the UL PPDU carrying the second frame. Related specific examples will be described later with reference to FIGS. 22, 23, and 24.

Further, to maintain a low Peak to Average Power Ratio (PAPR), the AP transmitting the DL PPDU including the first frame may apply different data scrambling to data fields (e.g., HE-DATA fields or PSDUs) transmitted on different subchannels. A related specific example will be described later with reference to FIG. 27.

In step S1820, the AP may transmit the first frame in the DL PPDU to an STA group including the one or more STAs.

Each of the one or more STAs receiving the first frame may determine the type (e.g., short HE-STF symbol duration or long HE-STF symbol duration) of an HE-STF included in the DL PPDU carrying the first frame based on information included in the DL PPDU carrying the first frame. For example, upon receipt of the DL PPDU carrying the first frame, an STA may determine the type of an HE-STF included in the DL PPDU based on a value of a Length field of an L-SIG included in the DL PPDU. Related specific examples will be described later with reference to FIGS. 25 and 26.

In step S1830, each of the one or more STAs may generate a UL PPDU including a second frame based on information indicated by the DL PPDU including the first frame.

The type of the UL PPDU including the second frame, the type of an HE-LTF included in the UL PPDU, the length of the UL PPDU, etc. may be determined based on information included in the DL PPDU carrying the first frame. Related specific examples will be described later with reference to FIGS. 19 to 26.

If the second frame is a control response frame to the first frame, the second frame may include a Transmitter Address (TA) field. Also, if the AP fails to receive the second frame or fails to receive a valid second frame (particularly, a valid second frame from a primary receiving STA) within a predetermined timeout interval after transmitting the DL PPDU including the first frame, the AP may determine transmission failure of the DL PPDU including the first frame. Related specific examples will be described with reference to FIGS. 19, 20, and 21.

Further, each of the one or more STAs may perform frequency offset compensation using the DL PPDU including the first frame as a reference frame for the UL PPDU including the second frame. Related specific examples will be described later with reference to FIGS. 22, 23, and 24.

In step S1840, each of the one or more STAs may transmit the second frame in the UL PPDU to the AP.

If a plurality of STAs transmit a UL PPDU to the AP, the plurality of STAs may simultaneously transmit second frames in the UL PPDU according to a UL MU transmission scheme (e.g., UL OFDMA and/or UL MU-MIMO).

In step S1850, the AP may transmit a DL PPDU including a third frame to the one or more STAs in response to the UL PPDU including the second frames transmitted by the one or more STAs. Related specific examples will be described with reference to FIGS. 22, 23, and 24.

If the second frame is a control response frame in response to the first frame, the third frame may not be transmitted. Related specific examples will be described later with reference to FIGS. 19, 20, and 21.

Figure 19:
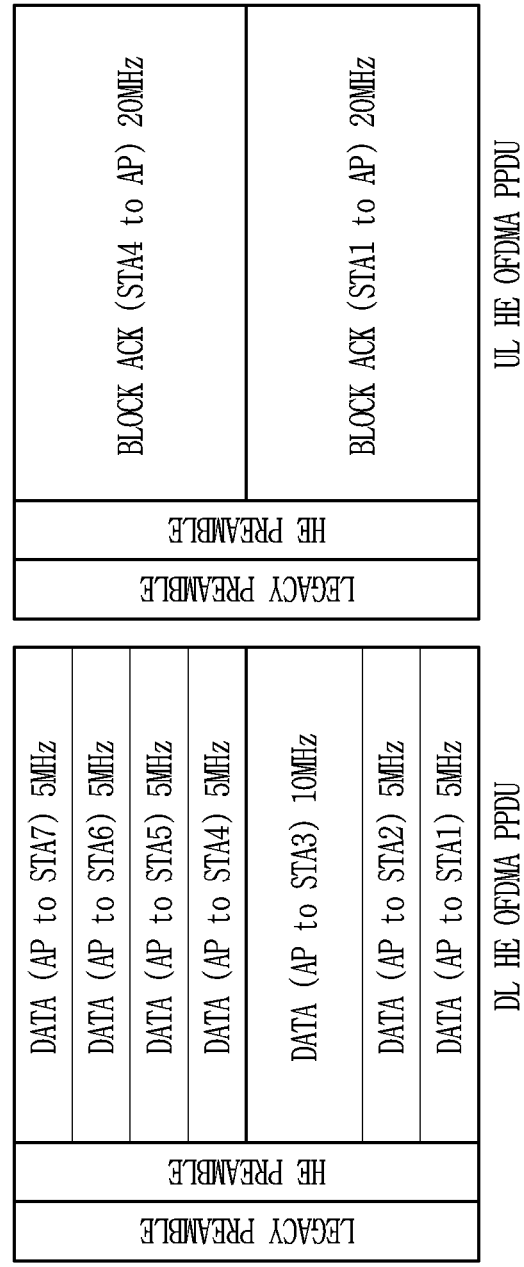
FIGS. 19 and 20 depict examples of a DL and UL MU frame exchange sequence according to the present disclosure.
Figure 20:
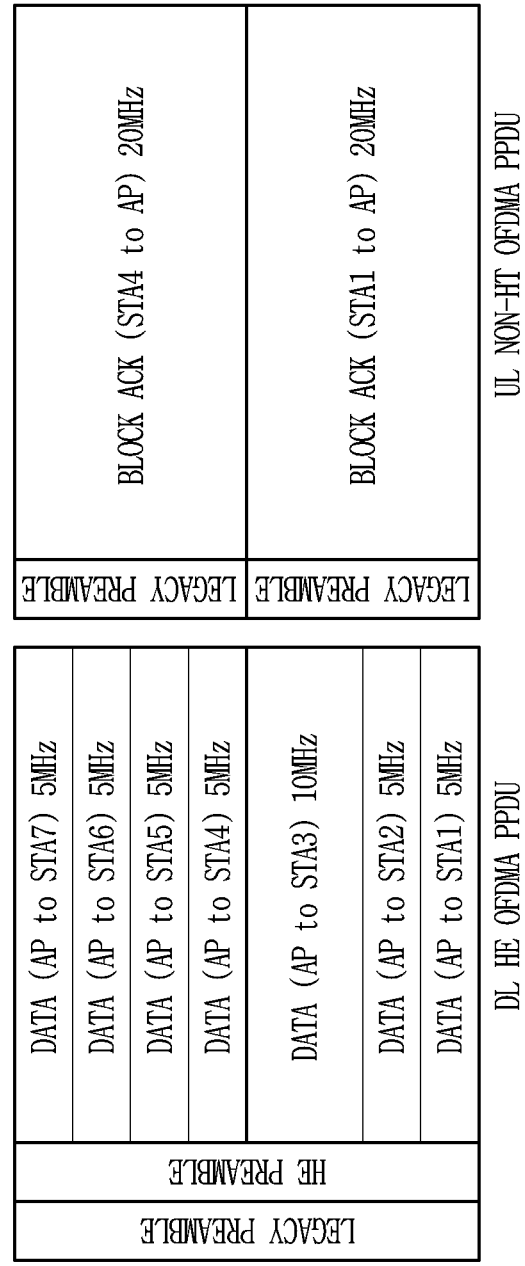

FIGS. 19 and 20 depict examples of a DL and UL MU frame exchange sequence according to the present disclosure.

FIG. 19 depicts an exemplary DL and UL MU frame exchange sequence used in an OFDMA mechanism. The AP may simultaneously transmit a DL OFDMA PPDU conforming to an HE OFDMA PPDU format (i.e., a DL HE OFDMA PPDU) to a plurality of STAs.

The format of the HE OFDMA PPDU may include a legacy preamble, an HE preamble, and PSDUs. The legacy preamble may be configured based on 64 FFT on a 20-MHz channel, and the HE preamble may be configured based on 256 FFT on a 20-MHz channel. In the following description, 64 FFT-based or 256 FFT-based transmission is performed mainly in the reference of a channel bandwidth of 20 MHz.

The PSDUs included in the HE OFDMA PPDU may include DATA for a plurality of STAs (e.g., STA1, STA2, STA3, STA4, STA5, STA6, and STA7). Herein, the AP may transmit the DATA for STA1, STA2, STA3, STA4, STA5, STA6, and STA7, respectively on 5-MHz, 5-MHz, 10-MHz, 5-MHz, 5-MHz, 5-MHz, and 5-MHz subchannels.

Upon receipt of the DL HE OFDMA PPDU from the AP, STA1 and STA4 may transmit control response frames in a UL OFDMA PPDU conforming an HE OFDMA PPDU format (i.e., a UL HE OFDMA PPDU) an SIFS after receiving the DL HE OFDMA PPDU.

In the example of FIG. 19, the control response frames included in the UL HE OFDMA PPDU may be immediate responses to a frame included in the DL HE OFDMA PPDU, and the frame included in the DL HE OFDMA PPDU may be a frame eliciting or soliciting the immediate responses.

Also, the control response frames may be, for example, block ACK frames, to which the present disclosure is not limited. A later-described ACK frame or HE ACK frame may be used as a control response frame.

A UL HE OFDMA PPDU is an MU PPDU supporting simultaneous transmission of control response frames on one channel from a plurality of STAs. Specifically, the UL HE OFDMA PPDU illustrated in the example of FIG. 19 is an HE PPDU transmitted on a single channel having a bandwidth of 40 MHz. That is, a legacy preamble is transmitted on the single 40-MHz channel, an HE preamble is transmitted on the single 40-MHz channel, and STA1 and STA4 transmit the control response frames respectively on two subchannels, in the one HE PPDU. As described above, the one UL HE OFDMA PPDU illustrated in FIG. 19 is an MU PPDU in which STA1 and STA4 simultaneously transmit control response frames on one 40-MHz channel.

That is, immediate responses to a frame soliciting the immediate responses are transmitted in an MU PPDU in the example of FIG. 19.

FIG. 20 depicts an additional example of the DL and UL MU frame exchange sequence used in the OFDMA mechanism. The AP may transmit a DL HE OFDMA PPDU simultaneously to a plurality of STAs, which has been described before with reference to FIG. 19.

STA1 and STA4 may transmit control response frames in a UL OFDMA PPDU conforming to a NON-HT PPDU format (i.e., a UL NON-HT OFDMA PPDU) an SIFS after receiving the DL HE OFDMA PPDU from the AP.

In the example of FIG. 20, the control response frames included in the UL NON-HT OFDMA PPDU may be immediate responses to a frame included in the DL HE OFDMA PPDU, and the frame included in the DL HE OFDMA PPDU may be a frame eliciting or soliciting the immediate responses.

Also, the control response frames may be, for example, block ACK frames, to which the present disclosure is not limited. A later-described ACK frame or HE ACK frame may be used as a control response frame.

A UL NON-HT OFDMA PPDU corresponds to an SU PPDU supporting transmission of a control response frame on one channel from a single STA. Specifically, the UL NON-HT OFDMA PPDU illustrated in the example of FIG. 20 supports simultaneous OFDMA transmission of a NON-HT PPDU on a low-frequency 20-MHz channel and a NON-HT PPDU on a high-frequency 20-MHz channel That is, a legacy preamble is transmitted on a single 20-MHz channel and the control response frame of STA1 is transmitted on the 20-MHz channel, in one NON-HT PPDU. At the same time, a legacy preamble is transmitted on another 20-MHz channel and the control response frame of STA4 is transmitted on the 20-MHz channel, in another NON-HT PPDU. As described above, the one UL NON-HT OFDMA PPDU illustrated in FIG. 20 corresponds to simultaneous transmission of one SU PPDU carrying a control response frame on one 20-MHz channel from one STA, and another SU PPDU carrying a control response frame on another 20-MHz channel from another STA. Since the two SU PPDUs are multiplexed and transmitted in different frequencies, it may be said that the SU PPDUs are transmitted in OFDMA.

That is, immediate responses to a frame soliciting the immediate responses are transmitted in SU PPDUs in the example of FIG. 20.

As described above with reference to the examples of FIGS. 19 and 20, control response frames transmitted in a UL MU scheme (i.e., UL OFDMA and/or UL MU-MIMO) may be configured in the same-type PPDU format (i.e., an MU PPDU format (e.g., an HE PPDU format) or an SU PPDU format (e.g., a NON-HT PPDU format)). That is, control response frames transmitted simultaneously from a plurality of STAs may be transmitted in the MU PPDU format or the SU PPDU format.

In order to enable STAs transmitting control response frames to use the same-type PPDU format, a method for determining a PPDU format by the STAs transmitting control response frames may be defined.

According to the present disclosure, an STA transmitting a control response frame (or an immediate response) may determine the type or format of a PPDU carrying the control response frame (or the immediate response) based on information included in a frame eliciting the control response frame (or a frame soliciting the immediate response). Specifically, the type of the PPDU carrying the control response frame (or the immediate response) may be determined to be one of SU PPDU or MU PPDU based on the information included in the frame eliciting the control response frame (or the frame soliciting the immediate response). More specifically, different information may be configured in the frame eliciting the control response frame (or the frame soliciting the immediate response) depending on whether the control response frame (or the immediate response) is transmitted in an SU PPDU or an MU PPDU.

For example, if a frame eliciting a control response frame includes trigger information for one or more control response frames, the one or more control response frames may be transmitted in an HE PPDU format. Or if the frame eliciting a control response frame does not include trigger information for one or more control response frames, the one or more control response frames may be transmitted in a NON-HT PPDU format.

Specifically, if a frame eliciting control response frames is transmitted in an HE PPDU format including subchannel allocation information for each of the control response frames, a plurality of STAs may transmit control response frames simultaneously in the HE PPDU format as illustrated in the example of FIG. 19. Or if the frame eliciting the control response frames is transmitted in an HE PPDU format without subchannel allocation information for each of the control response frames, the plurality of STAs may transmit the control response frames simultaneously in the NON-HT PPDU format as illustrated in the example of FIG. 20.

Also, the AP may explicitly indicate a PPDU type (e.g., an HE PPDU format or a NON-HT PPDU format) to be used for transmission of the control response frames in the frame eliciting the control response frames. The HE PPDU format supports MU transmission, whereas the NON-HT PPDU format supports only SU transmission, not MU transmission. Accordingly, a PPDU type may indicate whether control response frames are to be transmitted in an MU scheme (OFDMA and/or MU-MIMO) or an SU scheme.

For example, information indicating the type of a PPDU carrying a control response frame may be included in a MAC header of a frame eliciting the control response frame. Specifically, the information indicating the type of the PPDU carrying the control response frame may be included in an HE Control field of a MAC header of the frame eliciting the control response frame.

Or the information indicating the type of the PPDU carrying the control response frame may be included in a PHY header of the frame eliciting the control response frame. Specifically, the information indicating the type of the PPDU carrying the control response frame may be included in a SIG field of the PHY header of the frame eliciting the control response frame.

Upon receipt of a DL OFDMA PPDU including information indicating a PPDU type used for transmission of control response frames, STAs may transmit control response frames in the PPDU format indicated by the PPDU type information explicitly provided by the DL OFDMA PPDU.

Meanwhile, if an STA other than the STAs transmitting the control response frames is an STA supporting an OFDM PPDU (e.g., an STA conforming to the IEEE 802.11a/g/n/ac/ax standard) and receives a control response frame transmitted in the NON-HT PPDU format, the STA may update its NAV.

Further, if the control response frames are transmitted in an HE PPDU format according to a UL MU scheme, the control response frames may use the same HE-LTF type (e.g., compressed HE-LTF or uncompressed HE-LTF). An STA may set a value for a TXVECTOR parameter, HE_LTF_TYPE of a control response frame transmitted in the HE PPDU format according to a value of an RXVECTOR parameter, HE_LTF_TYPE of a frame eliciting a control response frame. Or the STA may set a predetermined value for the TXVECTOR parameter, HE_LTF_TYPE of the control response frame transmitted in the HE PPDU format. Accordingly, HE-LTFs included in the HE PPDU format used for transmission of control response frames from a plurality of STAs may be of the same type.

Figure 21:
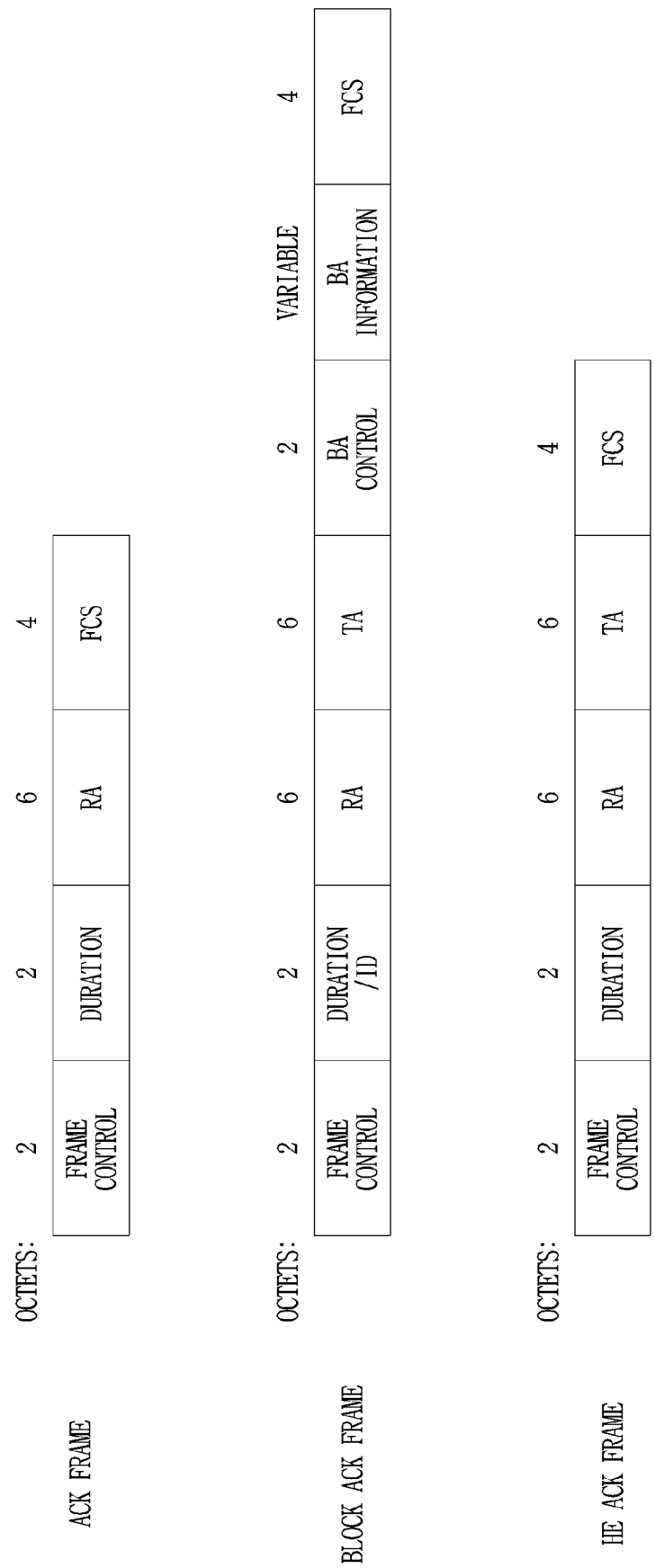
FIG. 21 depicts exemplary formats of an ACK frame, a block ACK frame, and an HE ACK frame.

FIG. 21 depicts exemplary formats of an ACK frame, a block ACK frame, and an HE ACK frame.

The ACK frame may include a 2-octet Frame Control field, a 2-octet Duration field, a 6-octet Receiver Address (RA) field, and a 4-octet Frame Check Sequence (FCS) field.

The block ACK frame may include a 2-octet Frame Control field, a 2-octet Duration/ID field, a 6-octet RA field, a 6-octet TA field, a 2-octet Block ACK (BA) Control field, a variable-length BA Information field, and a 4-octet FCS field.

The HE ACK frame may include a 2-octet Frame Control field, a 2-octet Duration field, a 6-octet RA field, a 6-octet TA field, and a 4-octet FCS field.

As described above, compared to the ACK frame, the block ACK frame or the HE ACK frame may further include a 6-octet TA field.

Each of control response frames transmitted in a UL MU scheme may include a TA field indicating an STA transmitting the control response frame. That is, HE ACK frames or block ACK frames may be used on behalf of ACK frames, as control response frames transmitted simultaneously by a plurality of STAs.

If a control response frame is configured in an Aggregated-MPDU (A-MPDU) format transmitted in a UL MU scheme, the A-MPDU may include one or more MPDUs each including a TA field. Regarding a TXVECTOR parameter of a control response frame transmitted in the UL MU scheme, an STA performing the UL MU transmission may set a value for a parameter indicating the type of a GI, GI_TYPE among TXVECTOR parameters of a control response frame transmitted in an HE PPDU according to a value of an RXVECTOR parameter, GI_TYPE of a frame eliciting the control response frame. Further, the STA performing the UL MU transmission may set a TXVECTOR parameter, GI_TYPE of a control response frame transmitted in a NON-HT PPDU to a long GI value (e.g., 0.8 μs defined by LONG_GI).

Meanwhile, PHY-DATA.indication, PHY-TXEND.confirm, PHY-RXSTART.indication, and PHY-RXEND.Indication primitives are defined as follows.

The PHY-DATA.indication primitive indicates data transfer from a PHY to a local MAC entity. This primitive provides parameters illustrated in Table IV below.

TABLE IV

PHY-DATA.indication(
   DATA
   USER_INDEX
)

In Table IV, the DATA parameter is an octet having a value ranging from X'00' to X'FF'.

In Table IV, the USER_INDEX parameter may be represented generally as u for an HE STA. The USER_INDEX parameter exists for an MU PPDU, and indicates a user index in RXVECTOR to which the DATA octet is applied. Otherwise, the USER_INDEX parameter may not exist.

The PHY-DATA.indication primitive may be generated for a PHY entity of a receiver to transfer a received data octet to a local MAC entity. A time spanning from reception of the last bit of a last octet received on a wireless medium to reception of the PHY-DATA.indication primitive at the MAC entity corresponds to a processing delay at the PHY, which may be represented as aRxPHYDelay.

The PHY-TXEND.confirm primitive may be issued to confirm transmission completion at the PHY to the local MAC entity. This primitive may include no parameters. When a symbol including a last data octet has been transferred and Signal Extension exists, upon expiration of the Signal Extension, the PHY may issue the PHY-TXEND.confirm primitive to the MAC entity. Reception of this primitive at the MAC entity may provide a time reference for a contention backoff protocol.

Further, the PHY-RXSTART.indication primitive corresponds to indication information indicating that the PHY has received a valid start of a PPDU including a valid PHY header. The PHY-RXSTART.indication primitive provides a parameter as illustrated in Table V.

TABLE V

PHY-RXSTART.indication(
   RXVECTOR
)

In Table V, RXVECTOR indicates a list of parameters that the PHY provides to the local MAC entity, when the PHY receives a valid PHY header or the last PSDU data bit of a received frame.

When the PHY validates the PHY header successfully at the start of a new PPDU, a local PHY entity generates this primitive and transmits the primitive to a MAC sublayer. After generating the PHY-RXSTART.indication primitive, the PHY is expected to be kept in a physical medium busy state during a time period needed for the PHY to transmit a frame according to an indicated LENGTH and DATARATE (without generating a PHY-CCA.indication(IDLE) primitive). Even though the PHY generates a PHY-RXEND.indication(CarrierLost) primitive or a PHY-RXEND.indication(Format-Violation) primitive before the time period elapses, this physical medium busy condition may be maintained.

Further, the PHY-RXEND.Indication primitive corresponds to indication information by which the PHY indicates to the local MAC entity that an on-going PSDU has been completely received. The PHY-RXEND.Indication primitive provides parameters as illustrated in Table VI.

TABLE VI

PHY-RXEND.indication(
RXERROR,
RXVECTOR
)

In Table VI, the RXERROR parameter may deliver one or more of values indicating NoError, FormatViolation, CarrierLost, and UnsupportedRate. After a receive state machine of the PHY detects what looks like a valid preamble and Start Frame Delimiter (SFD), a plurality of error conditions may occur. The following parameters are returned for the respective error conditions.

NoError. This value is used to indicate that no error has occurred during a reception process at the PHY.

Format Violation. This value is used to indicate that there is an error in the format of the received PPDU.

CarrierLost. This value is used to indicate that a carrier cannot be found during reception of an incoming PSDU and thus PSDU processing cannot be performed any longer.

UnsupportedRate. This value is used to indicate that an unsupported data rate has been detected during reception of an incoming PPDU.

Filtered. This value is used to indicate that an incoming PPDU has been filtered out due to a condition set by PHYCONFIG_VECTOR during reception of the incoming PPDU.

In Table VI, RXVECTOR represents a list of parameters provided to the local MAC entity by the PHY, when the PHY receives a valid PHY header or the last PSDU data bit of a received frame. Only if a dot11RadioMeasurementActivated parameter is set to true, RXVECTOR is included. RXVECTOR may include all of MAC parameters and MAC management parameters.

The PHY-RXEND.Indication primitive may be generated to indicate to the local MAC entity that the receive state machine of the PHY has completed reception with or without an error. In the presence of Signal Extension, the PHY-RXEND.Indication primitive may be generated at the ending point of the Signal Extension.

If the value of RXERROR is NoERROR, the MAC may use the PHY-RXEND.Indication primitive as a reference for a channel access timing.

When the MAC receives the PHY-RXEND.Indication primitive, inter-frame space processing may start.

Now, a description will be given of an operation for transmitting a DL MU PPDU to a plurality of STAs and receiving control response frames in response to the transmitted DL MU PPDU in a UL MU scheme by an AP, based on understanding of the above-described PHY-DATA.indication, PHY-TXEND.confirm, PHY-RXSTART.indication, and PHY-RXEND.Indication primitives.

Upon receipt of control response frames transmitted in the UL MU scheme, the AP may transmit payload (i.e., DATA) along with a PHY-DATA.indication primitive from the PHY to the local MAC entity.

Also, the AP may determine whether transmission of a PPDU in a DL MU scheme (e.g., transmission of a DL OFDMA PPDU) has been failed as follows.

After transmitting one or more MPDUs soliciting one or more immediate response frames from one or more STAs, the AP may wait during a timeout interval corresponding to a predetermined duration after issuing a PHY-TXEND.confirm primitive.

The one or more MPDUs may be, for example, a part of a DL OFDMA PPDU and correspond to one or more A-MPDUs or one or more HE single MPDUs. An A-MPDU is configured to include one or more MPDUs each transported as a single PSDU by the PHY. An HE single MPDU refers to an MPDU which is the only one MPDU included in an A-MPDU transmitted in an HE PPDU, has an MPDU delimiter field with an End of Frame (EOF) subfield set to 1, and is transmitted in an A-MPDU subframe.

Further, the timeout interval may have, for example, a duration of aSIFSTime+aSlotTime+aRxPHYStartDelay.

If the PHY-RXSTART.indication primitive is not generated during the timeout interval, the AP may determine that the transmission of the DL OFDMA PPDU has been failed. Upon receipt of at least one response frame, the AP may not determine that the transmission of the DL OFDMA PPDU has been failed.

If the PHY-RXSTART.indication primitive is generated during the timeout interval, the AP may retain the PHY-RXSTART.indication primitive to recognize one or more valid response frames transmitted from one or more receiving STAs of the DL OFDMA PPDU requesting one or more response frames. Recognition of transmission failure of the DL OFDMA PPDU addressed to the one or more receiving STAs may be determined individually for each of receiving STAs to which individual immediate response frames are requested.

Also, a transmission failure event corresponding to failure to receive valid response frames from one or more primary receiving STAs may be interpreted as failure of the DL OFDMA PPDU. The AP may invoke a backoff procedure after the failure of the DL OFDMA PPDU.

If a control response frame transmitted by an STA occupies a primary channel, the STA may be a primary receiving STA. On the other hand, if a control response frame transmitted by an STA occupies a non-primary channel, the STA may be a non-primary receiving STA.

Even though the AP receives a valid response frame from the non-primary receiving STA, if the AP fails to receive a valid response frame from the primary receiving STA, the AP may interpret this as failure of the DL OFDMA PPDU.

As described before, to support NON-HT control responses or HE control responses in an MU scheme, a PPDU format may be determined for the control response frames from a frame eliciting the control responses (specifically, based on information included in the control response frames). Therefore, the same PPDU format may be determined for control response frames transmitted in UL MU by a plurality of STAs.

Meanwhile, if a DL frame transmitted from the AP to a plurality of STAs is a frame eliciting UL transmission, the DL frame may be used as a reference frame for the timing of the UL transmission of the plurality of STAs. The plurality of STAs may start the UL MU transmission an SIFS after the ending time of the reference frame. In the UL MU transmission, each of the plurality of STAs may reply to the AP with a UL start indication with a timing accuracy in the order of 100 ns. Accordingly, the starting points of UL transmissions from the plurality of STAs may be substantially aligned with each other.

Also, an STA may correct a UL transmission in consideration of a frequency offset for the AP, Specifically, each of the plurality of STAs may correct its frequency offset based on a frequency offset of the reference frame. For example, if a center frequency in which the STA operates is different from the center frequency of the reference frame, the center frequency of the STA may be aligned with the center frequency of the reference frame. This is done to solve the problem that each STA considers a different subcarrier location when a plurality of STAs perform UL transmissions simultaneously.

In the examples of FIGS. 19 and 20, since a DL HE OFDMA PPDU elicits control response frames transmitted in a UL OFDMA PPDU, the DL HE OFDMA PPDU may be used as a reference frame to compensate a frequency offset for the AP. After receiving the DL HE OFDMA PPDU, STAs (for example, STA1 and STA4) transmitting control response frames elicited by the DL HE OFDMA PPDU may adjust their frequency offsets to the frequency offset of the received DL HE OFDMA PPDU. As described above, an STA may measure the frequency offset of the received frame and store the frequency offset measurement. For example, the STA may store the frequency offset measurement in a dot11HighEfficiencyFrequencyOffset MIB variable.

To increase the performance of UL MU transmission, the accuracy of frequency offset compensation needs to be increased. For example, if a UL MU PPDU is transmitted based on 256 FFT on a 20-MHz channel, a reference frame may also be transmitted based on 256 FFT with respect to a 20-MHz channel. If the frequency offset of a UL MU PPDU transmitted based on 256 FFT on a 20-MHz channel is compensated based on a reference frame transmitted based on 64 FFT having a coarser granularity than 256 FFT, the difference between the frequency offsets of UL transmissions of a plurality of STAs may become wider, thereby causing performance degradation. Or if UL transmissions of a plurality of STAs are based on 64 FFT with respect to a 20-MHz channel as in the example of FIG. 20, frequency offset compensation may be performed using a reference frame transmitted based on 64 FFT.

As described above, a frame eliciting a UL transmission and a UL frame transmitted as an immediate response to the frame eliciting the UL transmission may have the same frequency accuracy. For example, if a UL transmission elicited by a DL trigger frame uses an HE PPDU format transmitted based on 256 FFT with respect to a 20-MHz channel, the DL trigger frame may also be transmitted in the 256 FFT-based HE PPDU format. Or if a UL transmission elicited by a DL trigger frame uses a NON-HT PPDU format transmitted based on 64 FFT with respect to a 20-MHz channel, the DL trigger frame may also be transmitted in a 64 FFT-based HE PPDU format.

Figure 22:
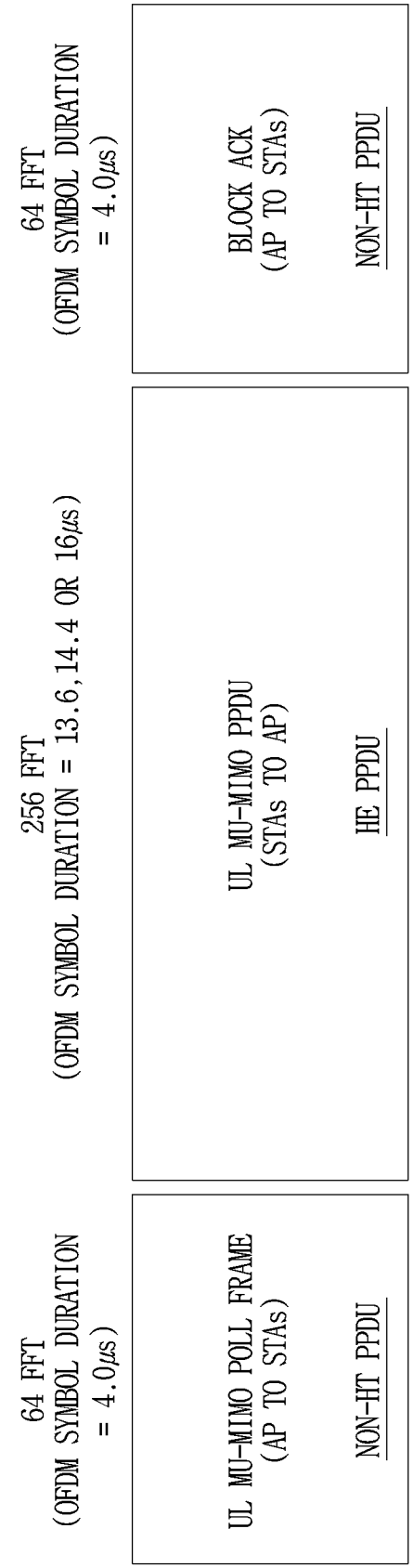
FIGS. 22, 23, and 24 depict exemplary UL MU polling procedures according to the present disclosure.
Figure 23:
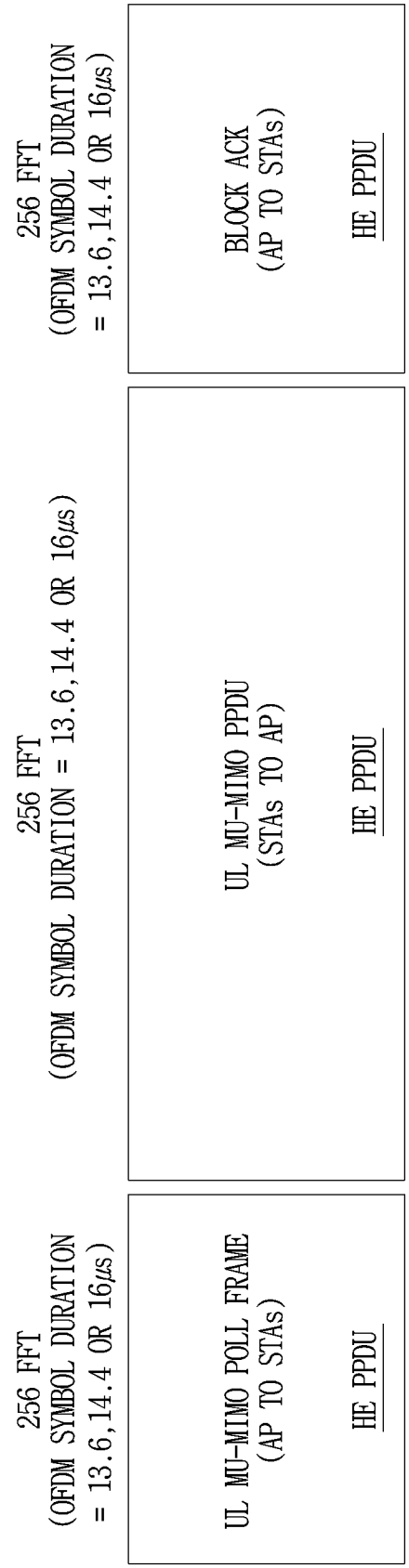
Figure 24:
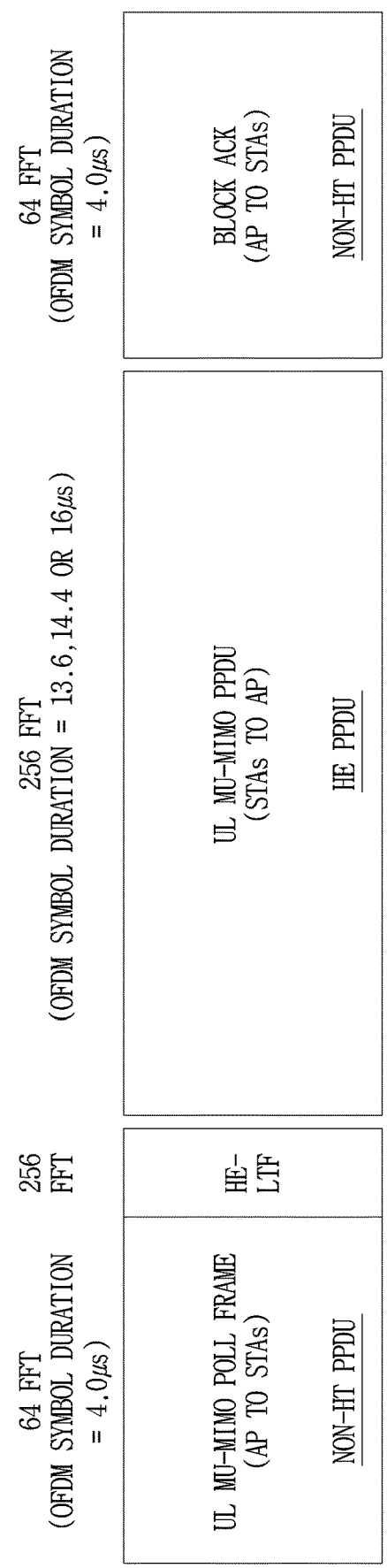

FIGS. 22, 23, and 24 depict exemplary UL MU polling procedures according to the present disclosure.

A UL MU polling procedure may include an operation for transmitting a frame polling UL MU transmissions to one or more STAs by an AP and performing the UL MU transmissions in response to the frame by the one or more STAs. Additionally, the UL MU polling procedure may further include an operation for transmitting an ACK for the UL MU transmissions by the AP.

For example, as illustrated in FIGS. 22, 23, and 24, UL MU transmissions from a plurality of STAs may be initiated by receiving a polling frame (or a trigger frame) from the AP. The polling frame (or trigger frame) may correspond to a frame eliciting a UL transmission or a frame soliciting a UL transmission. While a UL MU-MIMO transmission is shown as an exemplary UL MU transmission in FIGS. 22, 23, and 24, this does not limit the present disclosure. The present disclosure is also applicable to a UL OFDMA transmission.

As illustrated in the example of FIG. 22, the AP may transmit a polling frame (e.g., a UL MU-MIMO Poll frame) to one or more STAs to which UL MU-MIMO PPDU transmission is granted. For example, the UL MU-MIMO Poll frame may be transmitted in a NON-HT PPDU including 4.0-μs OFDM symbols based on 64 FFT with respect to a 20-MHz channel.

After receiving the UL MU-MIMO Poll frame, one or more granted STAs indicated by a UL Multi-User (MU) Polled STA field of the UL MU-MIMO Poll frame may transmit UL MU-MIMO PPDUs an SIFS after reception of the UL MU-MIMO Poll frame. For example, each of the UL MU-MIMO PPDUs may be configured as an HE PPDU including 13.6-μs, 14.4-μs, or 16-μs OFDM symbols based on 256 FFT with respect to a 20-MHz channel.

The AP may transmit a block ACK frame including ACK states for the UL MU-MIMO PPDUs transmitted by the one or more granted STAs. For example, the block ACK frame may be transmitted in a NON-HT PPDU including 4.0-μs OFDM symbols based on 64 FFT with respect to a 20-MHz channel.

As described above, increasing the accuracy of frequency offset compensation may be considered in order to increase the performance of a UL MU transmission. However, although a UL MU-MIMO PPDU is transmitted based on 256 FFT with respect to a 20-MHz channel, a reference frame (i.e., a UL MU-MIMO Poll frame) is transmitted based on 64 FFT. In this case, performance degradation may occur due to frequency offset inaccuracy.

Meanwhile, FIG. 23 depicts an example of using 256 FFT with respect to a 20-MHz channel, for a reference signal (i.e., a signal transmitted in a reference frame).

As illustrated in the example of FIG. 23, the AP may transmit a polling frame (e.g., a UL MU-MIMO Poll frame) to one or more STAs to which UL MU-MIMO PPDU transmission is granted. While a polling frame is transmitted in a 64 FFT-based NON-HT PPDU with respect to a 20-MHz channel in the example of FIG. 22, a polling frame may be transmitted in a 256 FFT-based HE PPDU in the example of FIG. 23. For example, a UL MU-MIMO Poll frame may be transmitted in an HE PPDU including 13.6-μs, 14.4-μs, or 16-μs OFDM symbols based on 256 FFT with respect to a 20-MHz channel.

After receiving the UL MU-MIMO Poll frame, one or more granted STAs indicated by a UL MU Polled STA field of the UL MU-MIMO Poll frame may transmit UL MU-MIMO PPDUs an SIFS after reception of the UL MU-MIMO Poll frame. For example, each of the UL MU-MIMO PPDUs may be configured as an HE PPDU including 13.6-μs, 14.4-μs, or 16-μs OFDM symbols based on 256 FFT with respect to a 20-MHz channel.

Herein, to compensate the frequency offset of a UL MU-MIMO PPDU transmitted based on 256 FFT with respect to a 20-MHz channel, a signal having a finer granularity (i.e., a reference signal transmitted in an HE PPDU) transmitted based on 256 FFT is used. Therefore, the performance of UL MU transmission may be increased.

The AP may transmit a block ACK frame including ACK states for the UL MU-MIMO PPDUs transmitted by the one or more granted STAs. For example, the block ACK frame may be transmitted in an HE-PPDU including 13.6-μs, 14.4-μs, or 16-μs OFDM symbols based on 256 FFT with respect to a 20-MHz channel.

If a signal based on 256 FFT with respect to a 20-MHz channel is used as a reference signal, the performance of UL MU transmission may be increased, as described above. However, a third-party legacy STA may not decode the reference signal transmitted in a MU-MIMO Poll frame of an HE PPDU. In this case, the third-party legacy STA may not set a NAV for transmission of a UL MU-MIMO PPDU following the reference signal, and thus may start its transmission during a time period in which the UL MU-MIMO PPDU is transmitted. As a result, the protection performance of the UL MU-MIMO PPDU may be lost.

Meanwhile, FIG. 24 depicts an example in which although a NON-HT PPDU based on 64 FFT with respect to a 20-MHz channel is used for a reference signal, a 256 FFT-based additional signal is appended after the reference signal transmitted in the NON-HT PPDU in order to enable more accurate frequency offset compensation.

As illustrated in the example of FIG. 24, the AP may transmit a polling frame (e.g., a UL MU-MIMO Poll frame) to one or more STAs to which transmission of UL MU-MIMO PPDUs is granted. For example, the UL MU-MIMO Poll frame may be transmitted in a NON-HT PPDU including 4.0-µs OFDM symbols based on 64 FFT with respect to a 20-MHz channel. Compared to the examples of FIGS. 22 and 23, the reference signal may be transmitted in a 64 FFT-based NON-HT PPDU with respect to a 20-MHz channel, and additionally, a 256 FFT-based signal (e.g., an HE-LTF) may be appended shortly after the NON-HT PPDU to increase the accuracy of frequency offset compensation.

After receiving the UL MU-MIMO Poll frame, one or more granted STAs indicated by a UL MU Polled STA field of the UL MU-MIMO Poll frame may transmit UL MU-MIMO PPDUs an SIFS after reception of the UL MU-MIMO Poll frame. For example, a UL MU-MIMO PPDU may be transmitted in an HE-PPDU including 13.6-µs, 14.4-µs, or 16-µs OFDM symbols based on 256 FFT with respect to a 20-MHz channel.

Since the more accurate 256 FFT-based signal (i.e., the 256 FFT-based signal appended to the reference signal) is used to compensate the frequency offsets of the UL MU-MIMO PPDUs transmitted based on 256 FFT with respect to a 20-MHz channel, the performance of UL MU transmission may be improved.

Because a third-party legacy STA may also decode the reference signal transmitted in the NON-HT PPDU, the third-party legacy STA does not perform it transmission, determining that a channel is busy during a time period over which the UL MU-MIMO PPDUs are transmitted. Thus, the protection performance of the UL MU-MIMO PPDUs may be increased.

The AP may transmit a block ACK frame including ACK states for the UL MU-MIMO PPDUs transmitted by the one or more granted STAs. For example, the block ACK frame may be transmitted in a NON-HT PPDU including 4.0-µs OFDM symbols based on 64 FFT with respect to a 20-MHz channel.

In the afore-described UL MU polling procedure, a polling frame may be transmitted based on 64 FFT with respect to a 20-MHz channel (e.g., in a NON-HT PPDU) or based on 256 FFT (e.g., in an HE PPDU). Therefore, a different UL MU polling operation may be performed according to a transmission scheme of the polling frame.

Also, to support UL MU transmission, an STA may declare its uplink MU transmission capability. For this purpose, an STA supporting UL MU transmission (e.g., a UL MU-MIMO transmission or a UL MU OFDMA transmission) may include an HE Capability element with an Uplink Multi-User Transmission Supported field set to true in a frame transmitted by the STA. On the other hand, an STA not supporting UL MU transmission may set an Uplink Multi-User Transmission Supported field to false in a frame including an HE Capability element. For example, the frame carrying the HE Capability element including the Uplink Multi-User Transmission Supported field may be a management frame transmitted by the STA. The management frame may include, for example, an Association Request frame, an Association Response frame, a Re-Association Request frame, a Re-Association Response frame, a Probe Request frame, and a Probe Response frame.

A frame triggering UL MU transmission may include information indicating the length of a UL MU PPDU transmitted by the trigger. Also, the information indicating the length of the UL MU PPDU may be set to or above a predetermined value.

For example, an STA to which UL MU transmission is granted may transmit a UL MU-MIMO PPDU an SIFS after receiving the UL MU-MIMO Poll frame. The duration of the UL MU-MIMO PPDU transmission (i.e., the length of the UL MU PPDU) may be determined according to an Uplink Multi-User Transmission Duration field (i.e., information indicating the length of the UL MU PPDU) included in the UL MU-MIMO Poll frame received from the AP.

Also, the granted STA may determine the duration of the UL MU-MIMO PPDU transmission to be equal to or less than the value of the Uplink Multi-User Transmission Duration field included in the UL MU-MIMO Poll frame. For example, the granted STA may set the length of the UL MU-MIMO PPDU to a value equal to the value of the Uplink Multi-User Transmission Duration field included in the UL MU-MIMO Poll frame.

If the value of the Uplink Multi-User Transmission Duration field is smaller than a minimum transmission time of a buffered non-fragmentable frame to be transmitted by the STA, the granted STA may not perform its granted UL MU-MIMO PPDU transmission. Herein, the non-fragmentable frame may correspond to an MPDU or a MAC management PDU (MMPDU) that cannot be fragmented. For example, a control frame such as an ACK frame, a block ACK frame, and a Power Save (PS)-Poll frame, and a management frame such as an Association Request Frame, a Re-Association Request frame, and a Probe Request frame may correspond to non-fragmentable frames.

On the other hand, in the case of a buffered fragmentable frame, the granted STA may satisfy the condition defined by the Uplink Multi-User Transmission Duration field by fragmenting the fragmentable frame before UL MU-MIMO PPDU transmission. This operation may increase implementation complexity.

In this context, to increase the efficiency of UL MU transmission, the STA may indicate its Minimum Uplink Multi-User Transmission Duration parameter in an HE Capability element of the frame transmitted by the STA. For example, the frame carrying the HE Capability element indicating the Minimum Uplink Multi-User Transmission Duration parameter may be a management frame transmitted by the STA. The management frame may include, for example, an Association Request frame, a Re-Association Request frame, and a Probe Request frame.

For example, the Minimum UL MU Transmission Duration parameter may be encoded to a size of 3 bits as illustrated in Table VII.

TABLE VII

| Minimum UL MU Transmission Duration parameter | Time unit | Byte unit |
| --- | --- | --- |
| 0 | 0.4 ms | 400 bytes |
| 1 | 0.8 ms | 800 bytes |
| 2 | 1.2 ms | 1200 bytes |
| 3 | 2.0 ms | 2000 bytes |
| 4 | 2.8 ms | 2800 bytes |

TABLE VII-continued

| Minimum UL MU Transmission Duration parameter | Time unit | Byte unit |
| --- | --- | --- |
| 5 | 3.6 ms | 3600 bytes |
| 6 | 4.4 ms | 4400 bytes |

If the Minimum UL MU Transmission Duration parameter has a value of 0, 1, 2, 3, 4, 5, 6, or 7, a minimum UL MU transmission duration supported by the STA is a time or a length of bytes corresponding to the value of the Minimum UL MU Transmission Duration parameter. For example, if the Minimum UL MU Transmission Duration parameter of an STA has a value of 0 in Table VII, a minimum UL MU transmission duration supported by the STA is 0.4 ms or a length of 400 bytes. The mapping relationship between the values of the Minimum UL MU Transmission Duration parameter and time or bytes in Table VII is exemplary, which should not be construed as limiting the present disclosure.

If an STA to which UL MU transmission is granted declares its Minimum UL MU Transmission Duration parameter to the AP, the value of the UL MU Transmission Duration field of a UL MU-MIMO Poll frame transmitted to the STA by the AP may be set to be equal to or larger than the value of the Minimum UL MU Transmission Duration parameter of the granted STA.

Or the AP may indicate its Minimum BSS UL MU Transmission Duration parameter in an HE Capability element of a frame transmitted by the AP. For example, the frame carrying the HE Capability element indicating the Minimum BSS UL MU Transmission Duration parameter may be a management frame transmitted by the AP. The management frame may include, for example, an Association Response frame, a Re-Association Response frame, a Probe Response frame, and a beacon frame.

For example, the Minimum BSS UL MU Transmission Duration parameter may be encoded to a size of 3 bits as illustrated in Table VIII below.

TABLE VIII

| Minimum BSS UL MU Transmission Duration parameter | Time unit | Byte unit |
| --- | --- | --- |
| 0 | 0.4 ms | 400 bytes |
| 1 | 0.8 ms | 800 bytes |
| 2 | 1.2 ms | 1200 bytes |
| 3 | 2.0 ms | 2000 bytes |
| 4 | 2.8 ms | 2800 bytes |
| 5 | 3.6 ms | 3600 bytes |
| 6 | 4.4 ms | 4400 bytes |
| 7 | 5.2 ms | 5200 bytes |

If the Minimum BSS UL MU Transmission Duration parameter has a value of 0, 1, 2, 3, 4, 5, 6, or 7, a minimum UL MU transmission duration supported by the AP (or BSS) is a time or a length of bytes corresponding to the value of the Minimum BSS UL MU Transmission Duration parameter in Table VIII. For example, if the Minimum BSS UL MU Transmission Duration parameter of the AP (or BSS) has a value of 0 in Table VII, a minimum UL MU transmission duration supported by the AP (or BSS) is 0.4 ms or a length of 400 bytes. The mapping relationship between the values of the Minimum BSS UL MU Transmission Duration parameter and time or bytes in Table VIII is exemplary, which should not be construed as limiting the present disclosure.

Also, an STA participating in a UL MU transmission may prepare its buffered frame to satisfy the Minimum BSS UL MU Transmission Duration parameter declared by the AP. If an STA may not satisfy the Minimum BSS UL MU Transmission Duration parameter, the STA may not transmit an HE Capability element including a UL MU Transmission Supported field set to true to the AP.

Or the UL MU Transmission Duration field included in the UL MU-MIMO Poll frame may be set to or above a predetermined value. For example, the value of the UL MU Transmission Duration field may be set to an integer multiple of the transmission time of a minimum non-fragmentable frame. Herein, a minimum non-fragmentable frame may be a frame having the lowest of the durations of non-fragmentable frames (e.g., a control frame such as an ACK frame, a block ACK frame, and a PS-Poll frame, and a management frame such as an Association Request frame, a Re-Association Request frame, and a Probe Request frame). For example, the minimum non-fragmentable frame may correspond to an ACK frame. On the assumption that the ACK frame has a size of 14 octets and a transmission duration of 250 µs, the value of the UL MU Transmission Duration field included in the UL MU-MIMO Poll frame may be set to or above 250 µs (or may be set to an integer multiple of 250 µs).

While the foregoing examples have been described in the context of UL MU-MIMO transmission as an exemplary UL MU transmission, they are applicable in the same manner to UL OFDMA transmission. For example, a UL MU-MIMO Poll frame may be replaced with a frame triggering UL OFDMA transmission. In this case, a UL MU Transmission Duration field included in the frame triggering UL OFDMA transmission may be used for an STA to determine the transmission time of a UL OFDMA PPDU.

As described above, a procedure for indicating a UL MU capability may be provided according to the present disclosure. Particularly, a method for signaling UL MU capability information (e.g., a UL MU transmission duration, etc.) may be provided. Further, since an STA or an AP declares a minimum (BSS) UL MU transmission duration, implementation complexity involved in preparing a UL MU PPDU by the STA may be reduced.

FIGS. 25 and 26 depict additional exemplary HE PPDU formats according to the present disclosure.

FIG. 25 depicts an exemplary HE MU PPDU format conforming to an uncompressed HE-LTF mode, and FIG. 26 depicts an exemplary HE MU PPDU format conforming to a compressed HE-LTF mode.

To enable an HE PPDU format according to the present disclosure to support MU transmission (e.g., MU-MIMO and/or OFDMA transmission), information about a subchannel allocated to each of a plurality of STAs may be included in an HE-SIG field. For example, the subchannel allocation information may be included in an HE-SIG-A field or an HE-SIG-B field.

The subchannel allocation information may include Subchannel Allocation Structure (SAS) information (or an SAS field). The SAS information may be included in the HE-SIG-A or HE-SIG-B field.

The SAS information may indicate subchannel bandwidth units of various sizes. For example, in the case where information indicating the size of a subchannel bandwidth unit is 3 bits long, if the information is 0, it may indicate 5 MHz, if the information is 1, it may indicate 10 MHz, if the information is 2, it may indicate 20 MHz, if the information is 3, it may indicate 40 MHz, if the information is 4, it may indicate 80 MHz, and if the information is 5, it may indicate 160 MHz. To represent a subchannel allocation structure for allocating subchannels on the basis of a minimum subchannel bandwidth of 5 MHz by the SAS information, 32 pieces of 3-bit information indicating the size of a subchannel bandwidth unit are needed and thus the SAS information needs to be up to 96 bits long. However, the SAS information may be configured independently or individually for each 20-MHz channel in order to reduce the signaling overhead of the SAS information. That is, if SAS information for different 20-MHz channels is configured to allow different subchannel bandwidth units, 4 pieces of 3-bit information indicating the size of a subchannel bandwidth unit are needed to represent the subchannel allocation structure for allocating a subchannel on the basis of the minimum subchannel bandwidth, 5 MHz, and thus the SAS information needs to be 12 bits long. Accordingly, only up to 12-bit SAS information is required for each 20-MHz channel even in the case of the maximum transmission channel bandwidth, 160 MHz.

Also, the SAS information may be configured to indicate whether a subchannel is used (or allocated) by an index corresponding to the subchannel by predefining a subcarrier frequency range for each subchannel and setting an index for each subchannel.

Figure 27:
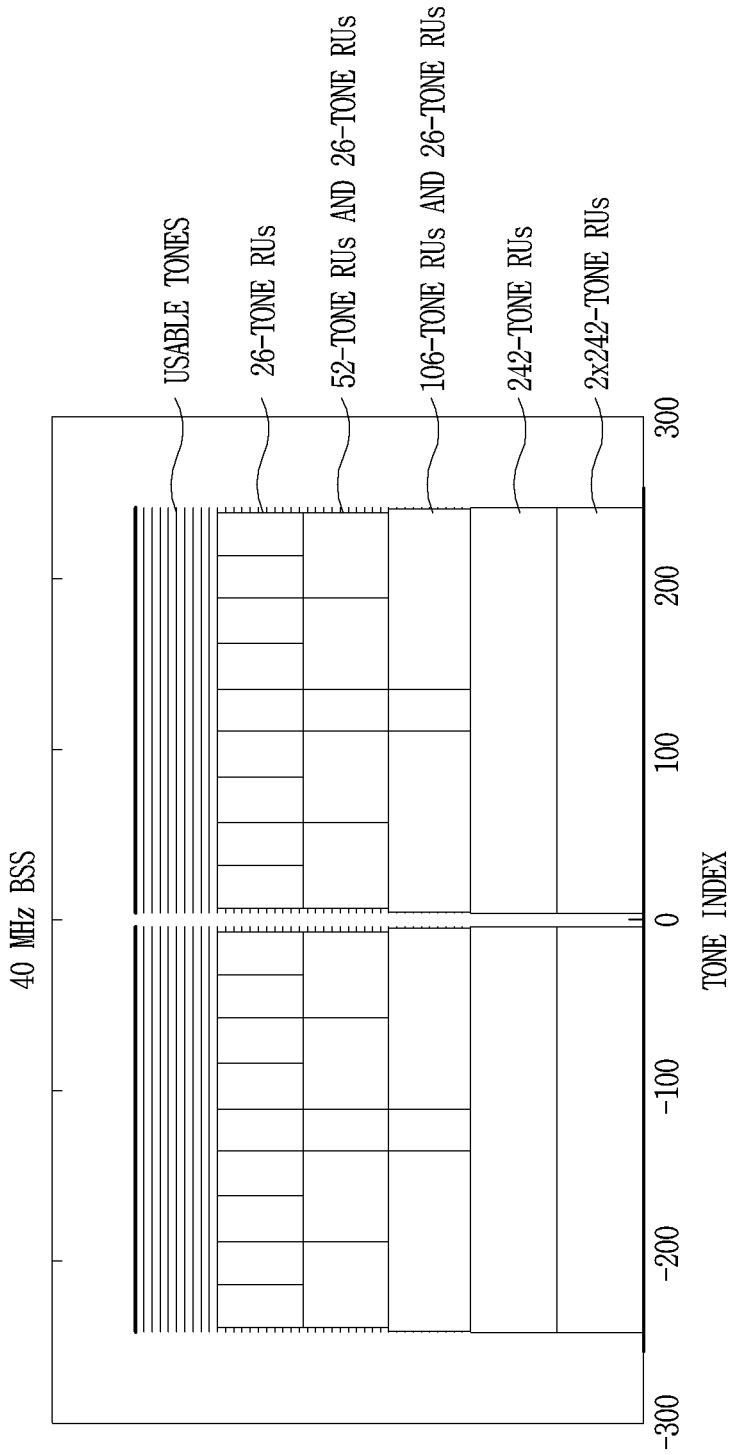
FIG. 27 depicts exemplary subchannels predefined in 40-MHz channels.

FIG. 27 depicts exemplary subchannels predefined in 40-MHz channels.

In the example of FIG. 27, tone plans for 40-MHz channels, that is, predefined 40-MHz OFDMA building blocks are illustrated. It is assumed that usable tones of a 40-MHz channel are 512 tones (or 512 subcarriers). That is, it is assumed that a transmission signal is configured based on 512 FFT with respect to a 40-MHz channel, and it may be said that the transmission signal has the same subcarrier spacing as a transmission signal configured based on 256 FFT with respect to a 20-MHz channel.

If each of all subchannels of a 40-MHz channel includes 26 tones (i.e., a 26-tone RU), each 26-tone RU may include 24 data tones and 2 pilot tones. Further, guard tones may be included at an edge part of the 40-MHz channel, and a left-over tone with energy 0 may exist between RUs. For example, the 512 tones of the 40-MHz channel may be composed of, in an ascending order of frequencies, 12 guard tones, 1 left-over tone, a 26-tone RU, a 26-tone RU, 2 left-over tones, a 26-tone RU, a 26-tone RU, 1 left-over tone, a 26-tone RU, 1 left-over tone, a 26-tone RU, a 26-tone RU, 2 left-over tones, a 26-tone RU, a 26-tone RU, 1 left-over tone, 5 DC tones, 1 left-over tone, a 26-tone RU, a 26-tone RU, 2 left-over tones, a 26-tone RU, a 26-tone RU, 1 left-over tone, a 26-tone RU, 1 left-over tone, a 26-tone RU, a 26-tone RU, 2 left-over tones, a 26-tone RU, a 26-tone RU, 1 left-over tone, and 11 guard tones.

If the subchannels of a 40-MHz channel are composed of 52-tone subchannels (i.e., 52-tone RUs) and 26-tone RUs, each of the 52-tone RUs may include 48 data tones and 4 pilot tones, and each of the 26-tone RUs may include 24 data tones and 2 pilot tones. Also, guard tones may be included at an edge part of the 40-MHz channel, and a left-over tone with energy 0 may exist between RUs. For example, the 512 tones of the 40-MHz channel may be composed of, in an ascending order of frequencies, 12 guard tones, 1 left-over tone, a 52-tone RU, 2 left-over tones, a 52-tone RU, 1 left-over tone, a 26-tone RU, 1 left-over tone, a 52-tone RU, 2 left-over tones, a 52-tone RU, 1 left-over tone, 5 DC tones, 1 left-over tone, a 52-tone RU, 2 left-over tones, a 52-tone RU, 1 left-over tone, a 26-tone RU, 1 left-over tone, a 52-tone RU, 2 left-over tones, a 52-tone RU, 1 left-over tone, and 11 guard tones.

If the subchannels of a 40-MHz channel are composed of 106-tone subchannels (i.e., 106-tone RUs) and 26-tone RUs, each of the 106-tone RUs may include 102 data tones and 4 pilot tones, and each of the 26-tone RUs may include 24 data tones and 2 pilot tones. Also, guard tones may be included at an edge part of the 40-MHz channel, and a left-over tone with energy 0 may exist between RUs. For example, the 512 tones of the 40-MHz channel may be composed of, in an ascending order of frequencies, 12 guard tones, 1 left-over tone, a 106-tone RU, 1 left-over tone, a 26-tone RU, 1 left-over tone, a 106-tone RU, 1 left-over tone, 5 DC tones, 1 left-over tone, a 106-tone RU, 1 left-over tone, a 26-tone RU, 1 left-over tone, a 106-tone RU, 1 left-over tone, and 11 guard tones.

If the subchannels of a 40-MHz channel are composed of 242 tones (i.e. 242-tone RUs), each 242-tone RU may include 234 data tones and 8 pilot tones. Also, guard tones may be included at an edge part of the 40-MHz channel, and a left-over tone with energy 0 may exist between RUs. For example, the 512 tones of the 40-MHz channel may be composed of, in an ascending order of frequencies, 12 guard tones, a 242-tone RU, 5 DC tones, a 242-tone RU, and 11 guard tones.

Also, a 40-MHz channel may include one subchannel with 2×242 tones (i.e., a 2×242-tone RU).

As in the example of FIG. 27, a subchannel allocation structure may be predefined according to a transmission channel size and indexes may be assigned to subchannels. Then, a subchannel allocated to each STA participating in DL/UL MU transmission may be indicated simply by the index of the subchannel.

Referring to FIGS. 25 and 26 again, the HE-SIG-B field may include information indicating an MCS, $N_{STS}$, use or non-use of beamforming, use or non-use of STBC, etc. for each subchannel. Also, information indicating the length of the HE-SIG-B field (e.g., information indicating the number of HE-SIG-B symbols) may be included in the HE-SIG-A field.

An HE-STF may be transmitted based on 256 FFT with respect to a 20-MHz channel and have a symbol duration of 4.0 μs or 8.0 μs. The HE-STF may be used for frequency offset estimation, phase offset estimation, etc. for decoding of a PSDU (i.e., HE-DATA) transmitted based on 256 FFT.

As one method in which an STA determines whether the symbol duration of an HE-STF is 4.0 μs or 8.0 μs, it may be defined that a trigger frame is always transmitted before transmission of an HE PPDU having a 8.0-μs HE-STF. Therefore, an STA that transmits or receives a trigger frame may determine that the symbol duration of an HE-STF of a subsequent HE PPDU (i.e., an HE PPDU transmitted based on the trigger) is 8.0 μs. Or if a trigger frame is not transmitted before transmission of an HE PPDU (i.e., an HE PPDU not based on a trigger), it may be determined that an HE-STF symbol duration is not necessarily 8.0 μs or it is 4.0 μs.

As an additional method in which an STA determines whether the symbol duration of an HE-STF is 4.0 μs or 8.0 μs, a Length field included in an L-SIG transmitted before the HE-STF in an HE PPDU may be used.

The Length field of the L-SIG may be set as illustrated in [Equation 1].

$$\text{Length} = \frac{(TXTIME - 20)}{4} \times 33 \quad \text{[Equation 1]}$$

In [Equation 1], TXTIME represents the duration (or transmission time) of an HE PPDU and may be defined by [Equation 2].

$$TXTIME = T_{LEG\_PREAMBLE} + T_{L-SIG} + T_{HE-SIG-A} + T_{HE-SIG-B} + \left\lceil \frac{T_{HE\_PREAMBLE} + T_{PSDU}}{T_{SYML}} \right\rceil \quad \text{[Equation 2]}$$

In [Equation 2], $T_{LEG\_PREAMBLE}$ may represent the duration of a legacy preamble (i.e., L-STF, L-LTF, and L-SIG), TL-SIG represents the duration of an RL-SIG, $T_{HE-SIG-A}$ may represent the duration of an HE-SIG-A, $T_{HE-SIG-B}$ may represent the duration of an HE-SIG-B, $T_{HE\_PREAMBLE}$ may represent the duration of an HE preamble (i.e., HE-STF and HE-LTF), and $T_{PSDU}$ may represent the duration of a PSDU (i.e., HE-DATA). $T_{SYML}$ may have a value corresponding to a long GI symbol interval (e.g., 4 μs).

An STA receiving an HE PPDU may calculate TXTIME from the value of the Length field of an L-SIG according to [Equation 1]. Further, the STA receiving the HE PPDU may determine the duration of an HE preamble, and the duration of a PSDU, etc. based on information about an HE-SIG-A, $N_{STS}$ of an HE-SIG-B, and a GI, etc., and calculate TXTIME based on the durations of the HE preamble and the PSDU by [Equation 2]. Herein, two TXTIME calculation results may be obtained on the assumptions of two cases in which the symbol duration of an HE-STF is 4.0 μs and 8.0 μs in determining the duration of the HE preamble.

As described above, one of a TXTIME calculation result obtained on the assumption that the HE-STF symbol duration is 4.0 μs by [Equation 2] and a TXTIME calculation result obtained on the assumption that the HE-STF symbol duration is 8.0 μs by [Equation 2], which matches with a TXTIME calculation result obtained by [Equation 1] may be determined. Accordingly, it may be determined whether the HE-STF symbol duration is 4.0 μs or 8.0 μs.

Specifically, $T_{HE\_PREAMBLE}$ may be defined by [Equation 3] on the assumption of a short HE-STF transmission time having a symbol duration of 4.0 μs (i.e., $T_{RE-SHORT-STF}$=4.0 μs) in [Equation 2].

$$T_{HE\_PREAMBLE} = T_{HE-SHORT-STF} + N_{HE-LTF} \times T_{HE-LTF} \quad \text{[Equation 3]}$$

Specifically, $T_{HE\_PREAMBLE}$ may be defined by [Equation 4] on the assumption of a long HE-STF transmission time having a symbol duration of 8.0 μs (i.e., $T_{HE-LONG-STF}$=8.0 μs) in [Equation 2].

$$T_{HE\_PREAMBLE} = T_{HE-ION-STF} + N_{HE-LTF} + N_{HE-LTF} \times T_{HE-LTF} \quad \text{[Equation 4]}$$

In [Equation 3] and [Equation 4], $N_{HE-LTE}$ is the number of HE-LTE symbols, and $T_{HE-LTE}$ is one HE-LTE symbol duration.

If the value of the Length field of the L-SIG matches with a value resulting from replacing TXTIME of [Equation 1] with a TXTIME calculation result of [Equation 2] based on $T_{HE\_PREAMBLE}$ of [Equation 3] calculated on the assumption of $T_{HE-SHORT-STF}$, the STA may determine that the HE-STF symbol duration is 4.0 μs. Or if the value of the Length field of the L-SIG matches with a value resulting from replacing TXTIME of [Equation 1] with a TXTIME calculation result of [Equation 2] based on $T_{HE\_PREAMBLE}$ of [Equation 3] calculated on the assumption of $T_{HE-LONG-STF}$, the STA may determine that the HE-STF symbol duration is 8.0 μs.

Referring to FIGS. 25 and 26 again, the HE-LTF may be transmitted based on 256 FFT with respect to a 20-MHz channel and used for channel estimation, for decoding of an HE PSDU transmitted based on 256 FFT.

Also, various HE-LTF types are available. For example, compressed HE-LTF and uncompressed HE-LTF are available and symbol durations are defined for the respective HE-LTF types, as illustrated in Table IX.

TABLE IX

|  | GI = 0.8 μs | GI = 1.6 μs | GI = 3.2 μs |
| --- | --- | --- | --- |
| compressed HE-LTF | 7.2 μs | 8.0 μs | 9.6 μs |
| uncompressed HE-LTF | 13.6 μs | 14.4 μs | 16.0 μs |

If a 4×OFDM symbol duration is applied to an HE-LTF, the HE-LTF may be an uncompressed HE-LTF. The 4×OFDM symbol duration applied to an uncompressed HE-LTF means a 12.8-μs OFDM symbol (except for a GI) based on 256 FFT with respect to a 20-MHz channel. If a GI is included, the symbol duration of the uncompressed HE-LTF may be 13.6 μs, 14.4 μs, and 16.0 μs, respectively for GI lengths of 0.8 μs, 1.6 μs, and 3.2 μs, as listed in Table IX.

If a 2×OFDM symbol duration is applied to an HE-LTF, the HE-LTF may be a compressed HE-LTF. The 2×OFDM symbol duration applied to a compressed HE-LTF means a 6.4-μs OFDM symbol (except for a GI) based on 128 FFT with respect to a 20-MHz channel. If a GI is included, the symbol duration of the compressed HE-LTF may be 7.2 μs, 8.0 μs, and 9.6 μs, respectively for GI lengths of 0.8 μs, 1.6 μs, and 3.2 μs, as listed in Table IX.

For the purpose of reducing time overhead generated when an HE-LTF sequence is transmitted based on 256 FFT with respect to a 20-MHz channel, a compressed HE-LTF may be configured by using only a half of the time of an uncompressed HE-LTF except for a GI as an HE-LTF sequence. In configuring the compressed HE-LTF, the GI may be added separately without being compressed.

Specifically, HE-LTF compression may be performed by reducing the per-symbol duration of an HE-LTF to 1/n by sampling every $n^{th}$ tones and truncating a first or second period per symbol in the time domain in an uncompressed HE-LTF.

For example, if n=2, the 2×HE-LTF symbol duration of a compressed HE-LTF may be obtained by inserting non-zero HE-LTF sequence values in tones ±2, ±4, ±6, . . . of an uncompressed HE-LTF having the 4×OFDM duration. That is, a 6.4-μs HE-LTF symbol duration except for a GI may be obtained by modulating every other tone of a 12.8-μs OFDM symbol except for a GI and removing the first or last half OFDM symbols in the time domain.

Also, if n=4, a 1×HE-LTF symbol duration of a compressed HE-LTF may be achieved by inserting non-zero HE-LTF sequence values in tones ±4, ±8, ±12, . . . of an uncompressed HE-LTF having the 4×OFDM duration. That is, a 3.2-μs HE-LTF symbol duration except for a GI may be obtained by modulating every fourth tone of a 12.8-μs OFDM symbol except for a GI and removing the first or last ¾ OFDM symbols in the time domain.

Information indicating an HE-LTF symbol duration may be included in an HE-SIG-A field of an HE PPDU. For example, the information indicating an HE-LTF symbol duration may include information indicating whether a compressed HE-LTF or an uncompressed HE-LTF (which one is used among 1×HE-LTF, 2×HE-LTF, and 4×HE-LTF) is used in the HE PPDU.

Additionally, regarding UL MU PPDU transmission, when the AP transmits a trigger frame including information that schedules the UL MU PPDU transmission to a plurality of STAs, information indicating whether an HE-LTF to be used in the UL MU PPDU transmission is a compressed HE-LTF or an uncompressed HE-LTF (or information indicating an HE-LTF symbol duration) may be included in the trigger frame. Therefore, the UL MU PPDU transmission may be performed using the HE-LTF type indicated by the AP (or the HE-LTF symbol duration indicated by the AP).

Also, if a control response frame is transmitted in a UL MU PPDU, as a ACK to transmission of a DL HE PPDU, the UL MU PPDU including the control response frame may be transmitted using an HE-LTF of the same type as an HE-LTF in the DL HE PPDU including a frame eliciting the control response frame (or using an HE-LTF having a symbol duration equal to an HE-LTF symbol duration of the PPDU including the frame eliciting the control response frame).

Or the type of an HE-LTF (or the symbol duration of an HE-LTF) may be predetermined for UL MU PPDU transmission in order to reduce implementation complexity.

Meanwhile, the HE-LTF may have a duplicated waveform according to a subchannel allocation structure. If the same information is transmitted simultaneously on different subchannels, a PAPR may increase. The PAPR is a parameter representing the characteristics of a waveform, calculated by dividing the peak value of the amplitude of the waveform by a time-averaged Root Mean Square (RMS).

An STA transmitting an HE PPDU may apply phase rotation to subchannels in order to reduce the PAPR of an HE-LTF in the HE PPDU. For example, if one 20-MHz channel is divided into four subchannels and OFDMA transmission of the subchannels is supported, phase rotation sequences of 1, −1, −1, and −1 may be applied to the four respective subchannels. Further, the same phase rotation sequence as used for an uncompressed HE-LTF sequence may be applied to a compressed HE-LTF.

If a subchannel allocation structure predefines a subcarrier frequency range for each subchannel, phase rotation may be applied to the subcarrier frequency ranges to reduce the PAPR of HE-LTF transmission. For example, if usable subcarriers of one transmission channel is divided into four subcarrier frequency ranges, phase rotation sequences of 1, −1, −1, and −1 may be applied to the four respective subcarrier frequency ranges. Further, the same phase rotation sequence as used for an uncompressed HE-LTF sequence may be applied to a compressed HE-LTF.

Referring to FIGS. 25 and 26 again, the symbol duration of a PSDU (or HE-DATA) may be determined to be one of 13.6 μs, 14.4 μs, and 16.0 μs according to GI lengths of 0.8 μs, 1.6 μs, or 3.2 μs used for PSDU transmission. That is, the symbol duration of a PSDU may be 12.8 μs (except for a GI) based on 256 FFT with respect to a 20-MHz channel Information indicating the GI length of an OFDM symbol used for transmission of the PSDU may be included in an HE-SIG-A field.

Figure 28:
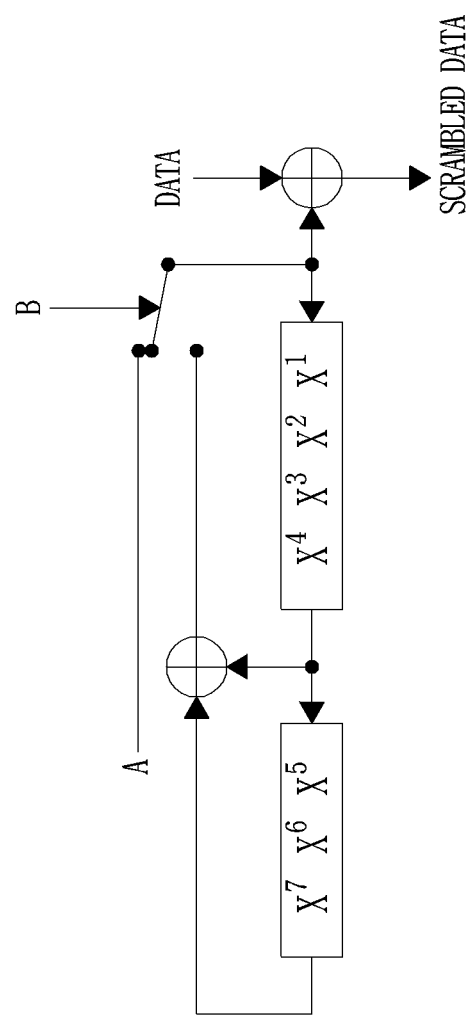
FIG. 28 depicts a data scrambler according to the present disclosure.

FIG. 28 depicts a data scrambler according to the present disclosure.

Even when different PSDUs are transmitted simultaneously on subchannels as in DL OFDMA transmission, a part (e.g., a MAC header) of each PSDU may be identical to parts of the other PSDUs. When the same information is transmitted simultaneously on different subchannels, a PAPR may increase, as described above.

To overcome this problem, if PSDUs are transmitted simultaneously on subchannels as in DL OFDMA transmission, different seed values may be set for a data scrambler, for encoding of a PSDU to be transmitted on each subchannel.

Referring to FIG. 28, a DATA field including a SERVICE field, a TAIL field, and a PAD field in a PPDU frame format (refer to FIG. 6) may be scrambled using a length 127 PPDU-synchronous scrambler as illustrated in the example of FIG. 28.

The data scrambler may place the octets of a PSDU sequentially in the order of bit 0 to bit 7 of a transmission serial bit stream. The PPDU-synchronous scrambler uses a generator polynomial $S(x)=x^7+x^4+1$, which may be represented as illustrated in FIG. 28.

In FIG. 28, A corresponds to the first 7 bits of a scrambling sequence. B indicates that if there is CH_BANDWIDTH_IN_NON_HT as a TXVECTOR parameter, a switch is connected to a path to A for bit 0 to bit 6 of the scrambling sequence, and otherwise, the switch is connected to the other path.

In FIG. 28, $X^1\ X^2\ X^3\ X^4\ X^5\ X^6\ X^7$ are set as a pseudorandom non-zero seed value.

In order to prevent simultaneous transmission of PSDUs on a plurality of subchannels in OFDMA from increasing a PAPR, all or a part of a seed value (i.e., $X^1\ X^2\ X^3\ X^4\ X^5\ X^6\ X^7$ in FIG. 28) at the data scrambler applied to encoding of a PSDU to be transmitted on each subchannel may be set to be different for each subchannel. Accordingly, since different data scrambling is applicable to the same parts of different PSDUs transmitted simultaneously, different signals may be transmitted eventually on a plurality of subchannels and low PAPR may be maintained.

As described above, a method for supporting different HE-STF types and different HE-LTF types in an HE MU PPDU format and signaling an HE-STF type and an HE-LTF type to be applied may be provided. Further, the performance of a transmitter may be increased by improving a data scrambler in an HE MU PPDU format transmitted in DL OFDMA.

While the afore-described example methods of the present disclosure have been described as a series of operations for simplicity of description, this does not limit the sequence of steps. In some embodiments, steps may be performed at the same time or in a different sequence. All of the example steps are not always necessary to implement the method proposed by the present disclosure.

The foregoing embodiments of the present disclosure may be implemented separately or combinations of two or more of the embodiments may be implemented simultaneously, for the afore-described example methods of the present disclosure.

The present disclosure includes an apparatus for processing or performing the method of the present disclosure (e.g., the wireless device and its components described with reference to FIGS. 1, 2, and 3).

The present disclosure includes software or machine-executable instructions (e.g., an operating system (OS), an application, firmware, a program, etc.) for executing the method of the present disclosure in a device or a computer, and a non-transitory computer-readable medium storing the software or instructions that can be executed in a device or a computer.

While various embodiments of the present disclosure have been described in the context of an IEEE 802.11 system, they are applicable to various mobile communication systems.

What is claimed is:

1. A method for exchanging frames by an access point (AP) in a wireless local area network, the method comprising:
    transmitting, in a downlink (DL) Physical layer Protocol Data Unit (PPDU) to one or more stations (STAs), a first frame to elicit a second frame from the one or more STAs, wherein the DL PPDU carrying the first frame includes information indicating a type of a PPDU carrying the second frame from a plurality of PPDU types, wherein the plurality of PPDU types include a High-Efficiency (HE) PPDU and a Non-High Throughput (Non-HT) PPDU; and
    receiving from the one or more STAs the second frame in an uplink (UL) PPDU having a type determined based on the information indicating the type of the PPDU,
    wherein the DL PPDU carrying the first frame further includes information indicating a length of the PPDU carrying the second frame, and
    wherein the information indicating the length of the PPDU carrying the second frame indicates a value equal to or greater than a predetermined minimum value.

2. The method according to claim 1,
    wherein the information indicating the type of the PPDU is included in a Medium Access Control (MAC) header of the first frame.

3. The method according to claim 1,
    wherein the DL PPDU carrying the first frame further includes information indicating a type of High-Efficiency-Long Training Field (HE-LTF) of the PPDU carrying the second frame from HE-LTF types including Compressed HE-LTF and Uncompressed HE-LTF.

4. The method according to claim 3,
    wherein the UL PPDU carrying the second frame includes one or more HE-LTF fields having a type determined based on the information indicating the type of HE-LTF.

5. The method according to claim 1,
    wherein a symbol duration of High-Efficiency-Short Training Field (HE-STF) of the PPDU carrying the second frame is determined based on whether the second frame is transmitted based on the first frame or not.

6. The method according to claim 5,
    wherein the symbol duration of HE-STF is 4.0 μs or 8.0 μs.

7. The method according to claim 1,
    wherein the AP determines a symbol duration of a HE-STF of the PPDU carrying the second frame based on a value of a Length field of a Legacy-SIGNAL (L-SIG) field of the PPDU carrying the second frame.

8. The method according to claim 1,
    wherein the plurality of PPDU types further include a Single User (SU) PPDU and a Multiple User (MU) PPDU.

9. The method according to claim 1,
    wherein a symbol duration of an High-Efficiency-Short Training Field (HE-STF) of the PPDU carrying the second frame is 8.0 μs based on the second frame being transmitted as an immediate response to the first frame.

10. A method for exchanging frames by a station (STA) in a wireless local area network, the method comprising:
    receiving a first frame from an access point (AP) in a downlink (DL) Physical layer Protocol Data Unit (PPDU), wherein the first frame triggers the STA to transmit a second frame, wherein the DL PPDU carrying the first frame includes information indicating a type of a PPDU carrying the second frame from a plurality of PPDU types, wherein the plurality of PPDU types include a High-Efficiency (HE) PPDU and a Non-High Throughput (Non-HT) PPDU; and
    transmitting to the AP the second frame in an uplink (UL) PPDU having a type determined based on the information indicating the type of the PPDU,
    wherein the DL PPDU carrying the first frame further includes information indicating a length of the PPDU carrying the second frame, and
    wherein the information indicating the length of the PPDU carrying the second frame indicates a value equal to or greater than a predetermined minimum value.

11. The method according to claim 10,
    wherein the information indicating the type of the PPDU is included in a Medium Access Control (MAC) header of the first frame.

12. The method according to claim 10,
    wherein the DL PPDU carrying the first frame further includes information indicating a type of High-Efficiency-Long Training Field (HE-LTF) of the PPDU carrying the second frame from HE-LTF types including a Compressed HE-LTF and an Uncompressed HE-LTF.

13. The method according to claim 12,
    wherein the UL PPDU carrying the second frame includes one or more HE-LTF fields having a type determined based on the information indicating the type of HE-LTF.

14. The method according to claim 10,
    wherein the symbol duration of HE-STF is 4.0 μs or 8.0 μs.

15. The method according to claim 10,
    wherein a symbol duration of HE-STF of the PPDU carrying the second frame is determined based on a value of a Length field of Legacy-SIGNAL (L-SIG) of the PPDU carrying the second frame.

16. The method according to claim 10,
    wherein a symbol duration of an High-Efficiency-Short Training Field (HE-STF) of the PPDU carrying the second frame is 8.0 μs based on the second frame being transmitted as an immediate response to the first frame.

17. A non-transitory machine-readable storage medium, which includes instruction that when performed by a station (STA) in a wireless local area network causes the STA to:
    receive a first frame from an access point (AP) in a downlink (DL) Physical layer Protocol Data Unit (PPDU), wherein the first frame triggers the STA to transmit a second frame, wherein the DL PPDU carrying the first frame includes information indicating a type of a PPDU carrying the second frame from a plurality of PPDU types, wherein the plurality of PPDU types include a High-Efficiency (HE) PPDU and a Non-High Throughput (Non-HT) PPDU; and
    transmit to the AP the second frame in an uplink (UL) PPDU having a type determined based on the information indicating the type of the PPDU,
    wherein the DL PPDU carrying the first frame further includes information indicating a length of the PPDU carrying the second frame, and wherein the information indicating the length of the PPDU carrying the second frame indicates a value equal to or greater than a predetermined minimum value.

18. The non-transitory machine-readable storage medium according to claim 17,
wherein a symbol duration of an High-Efficiency-Short Training Field (HE-STF) of the PPDU carrying the second frame is 8.0 µs based on the second frame being transmitted as an immediate response to the first frame.

* * * * *